(12) United States Patent
Bright

(10) Patent No.: US 10,982,699 B2
(45) Date of Patent: Apr. 20, 2021

(54) MODULAR FRAME ASSEMBLY

(71) Applicant: Steve Bright, St. Charles, MO (US)

(72) Inventor: Steve Bright, St. Charles, MO (US)

( * ) Notice: Subject to any disclaimer, the term of this patent is extended or adjusted under 35 U.S.C. 154(b) by 197 days.

(21) Appl. No.: 15/964,872

(22) Filed: Apr. 27, 2018

(65) Prior Publication Data

US 2018/0340560 A1    Nov. 29, 2018

Related U.S. Application Data

(60) Provisional application No. 62/503,008, filed on May 8, 2017.

(51) Int. Cl.
| | |
|---|---|
| *F16B 7/04* | (2006.01) |
| *F16B 12/40* | (2006.01) |
| *F16B 2/20* | (2006.01) |
| *F16M 13/02* | (2006.01) |
| *F16B 2/22* | (2006.01) |
| *F16M 1/00* | (2006.01) |

(52) U.S. Cl.
CPC ............. *F16B 7/044* (2013.01); *F16B 2/20* (2013.01); *F16B 2/22* (2013.01); *F16B 7/0426* (2013.01); *F16B 7/0486* (2013.01); *F16M 1/00* (2013.01); *F16M 13/02* (2013.01)

(58) Field of Classification Search
CPC ...... F16B 7/044; F16B 7/0426; F16B 7/0486; F16B 2/20; F16B 2/22; F16B 11/008; F16B 12/00; F16B 12/02; F16B 12/40; F16B 12/44; F16B 17/00; F16B 17/004; F16B 17/006; F16B 17/008; F16M 1/00; E04B 1/00; E04B 1/585; E04B 2103/00; E04B 2001/2406; E04B 2001/2451

USPC ....................................................... 248/309.1
See application file for complete search history.

(56) References Cited

U.S. PATENT DOCUMENTS

| | | | | |
|---|---|---|---|---|
| 1,150,781 | A * | 8/1915 | Louden ................. | E04B 1/1903 403/218 |
| 2,839,320 | A * | 6/1958 | Hill ........................ | F16B 7/04 403/172 |
| 3,856,246 | A * | 12/1974 | Sinko ..................... | F16L 3/222 248/68.1 |
| 4,045,104 | A * | 8/1977 | Peterson ............... | A47B 47/03 312/265.4 |
| 5,470,139 | A * | 11/1995 | Hsiao .................... | A47B 47/005 312/111 |
| 5,609,007 | A * | 3/1997 | Eichner ................. | E04B 9/064 52/506.07 |
| 6,612,086 | B2 * | 9/2003 | Pitt ......................... | E06B 9/01 403/174 |
| 7,140,578 | B1 * | 11/2006 | Robinett ................ | F16L 3/1226 248/49 |
| 7,341,391 | B2 * | 3/2008 | Nakahori ............... | F16B 7/0426 403/27 |

(Continued)

*Primary Examiner* — Nkeisha Smith
(74) *Attorney, Agent, or Firm* — Joseph E. Maenner; Maenner & Associates, LLC

(57) ABSTRACT

The present invention provides modular frame assembly including a plurality of connecting pieces. The connecting pieces can include a first plurality of coupling connectors, a second plurality of tee connectors, a third plurality of corner connectors, and a fourth plurality of elongate members. Each of the plurality of connecting pieces is adapted to receive at least two elongate members such that a rectangular structure can be constructed from the plurality of connecting pieces.

16 Claims, 37 Drawing Sheets

(56) References Cited

U.S. PATENT DOCUMENTS

| | | | | |
|---|---|---|---|---|
| 7,967,401 B2 * | 6/2011 | Hsu | ................... | A47B 47/0008 |
| | | | | 312/108 |
| 9,226,576 B2 * | 1/2016 | Shang | ................ | A47B 47/0075 |
| 9,255,396 B2 * | 2/2016 | Eberhart | ................. | F16B 7/044 |
| 9,554,493 B2 * | 1/2017 | Kawai | ................... | H01F 17/06 |
| 10,085,553 B2 * | 10/2018 | Funfgeld | ................ | F16B 12/14 |
| 10,458,114 B2 * | 10/2019 | Lestini | ................. | E04B 1/1912 |
| 2011/0179741 A1 * | 7/2011 | Yen | ................... | E04B 1/34326 |
| | | | | 52/653.1 |
| 2013/0068762 A1 * | 3/2013 | Ma | .................... | F16B 12/2036 |
| | | | | 220/4.27 |
| 2013/0299660 A1 * | 11/2013 | Emslie | ..................... | B60R 7/06 |
| | | | | 248/309.1 |
| 2016/0376811 A1 * | 12/2016 | Eberhart | .............. | F16B 7/0486 |
| | | | | 403/171 |
| 2018/0010624 A1 * | 1/2018 | Schlitter | .............. | F16B 7/0426 |
| 2019/0277022 A1 * | 9/2019 | Francis | ................ | F16B 7/0433 |

* cited by examiner

MODULAR FRAME ASSEMBLY

CROSS-REFERENCE TO RELATED APPLICATION

The present application claims priority from U.S. Provisional Patent Application Ser. No. 62/503,008, which was filed on May 8, 2017, and which is incorporated herein by reference in its entirety.

BACKGROUND OF THE INVENTION

U.S. Pat. No. 9,560,914 by the present inventor discloses a modular system for installing shelving between vertical wall studs, such in a shed or an unfinished garage. In locations without exposed vertical studs, there exists a need to provide a frame assembly that can be attached to a wall so that the patented system can be used.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention provides a modular frame assembly including a plurality of connecting pieces. The connecting pieces can include a first plurality of coupling connectors, a second plurality of tee connectors, a third plurality of corner connectors, and a fourth plurality of elongate members. Each of the plurality of connecting pieces is adapted to receive at least two elongate members such that a rectangular structure can be constructed from the plurality of connecting pieces.

In an alternative embodiment, the present invention provides a modular frame assembly comprising a plurality of connecting pieces. Each of the plurality of pieces comprises a base and a first sidewall extending upwardly from the base. The first sidewall has a first locking member extending upwardly from the first sidewall. The first locking member is defined by a first pair of parallel slots and a first tang extending outwardly from the first wall between the first pair of parallel slots. A second sidewall extends upwardly from the base, parallel to the first sidewall.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
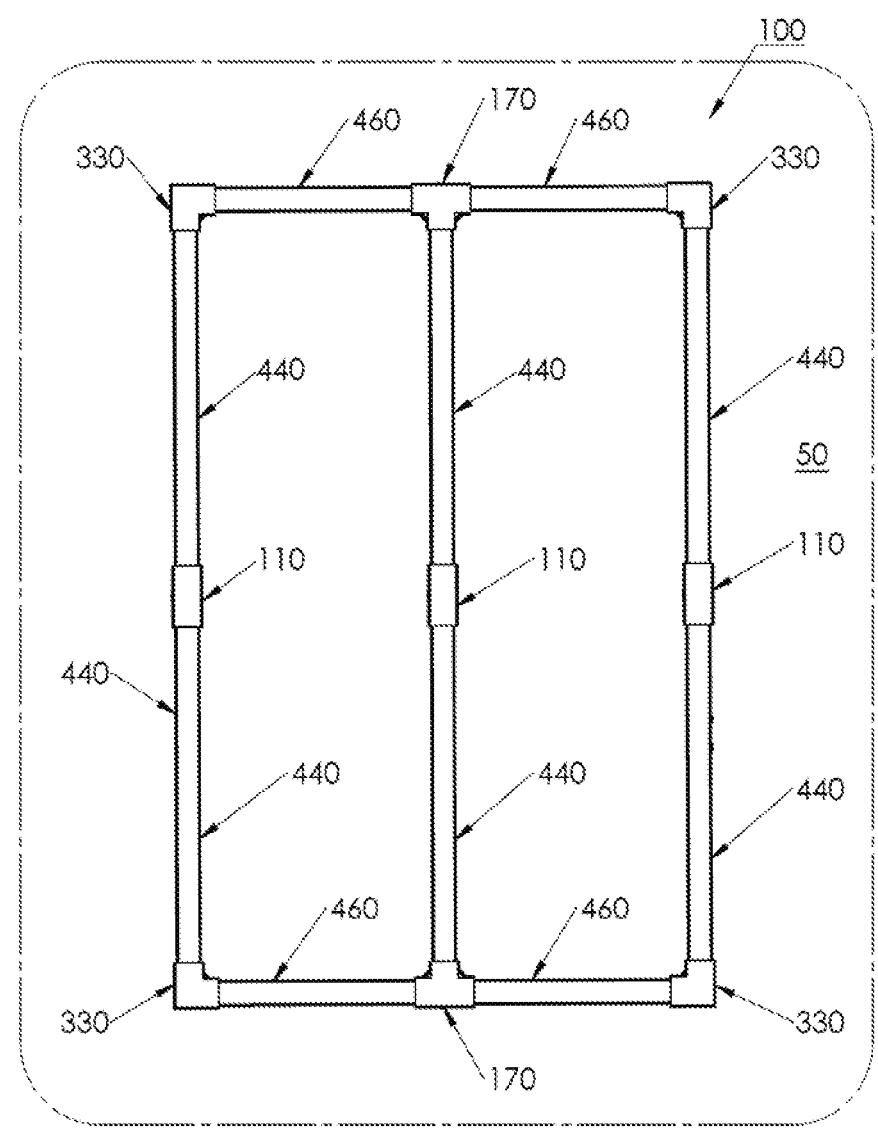
FIG. 1 is a front elevational view of a modular frame assembly according to an exemplary embodiment of the present invention.
Figure 2:
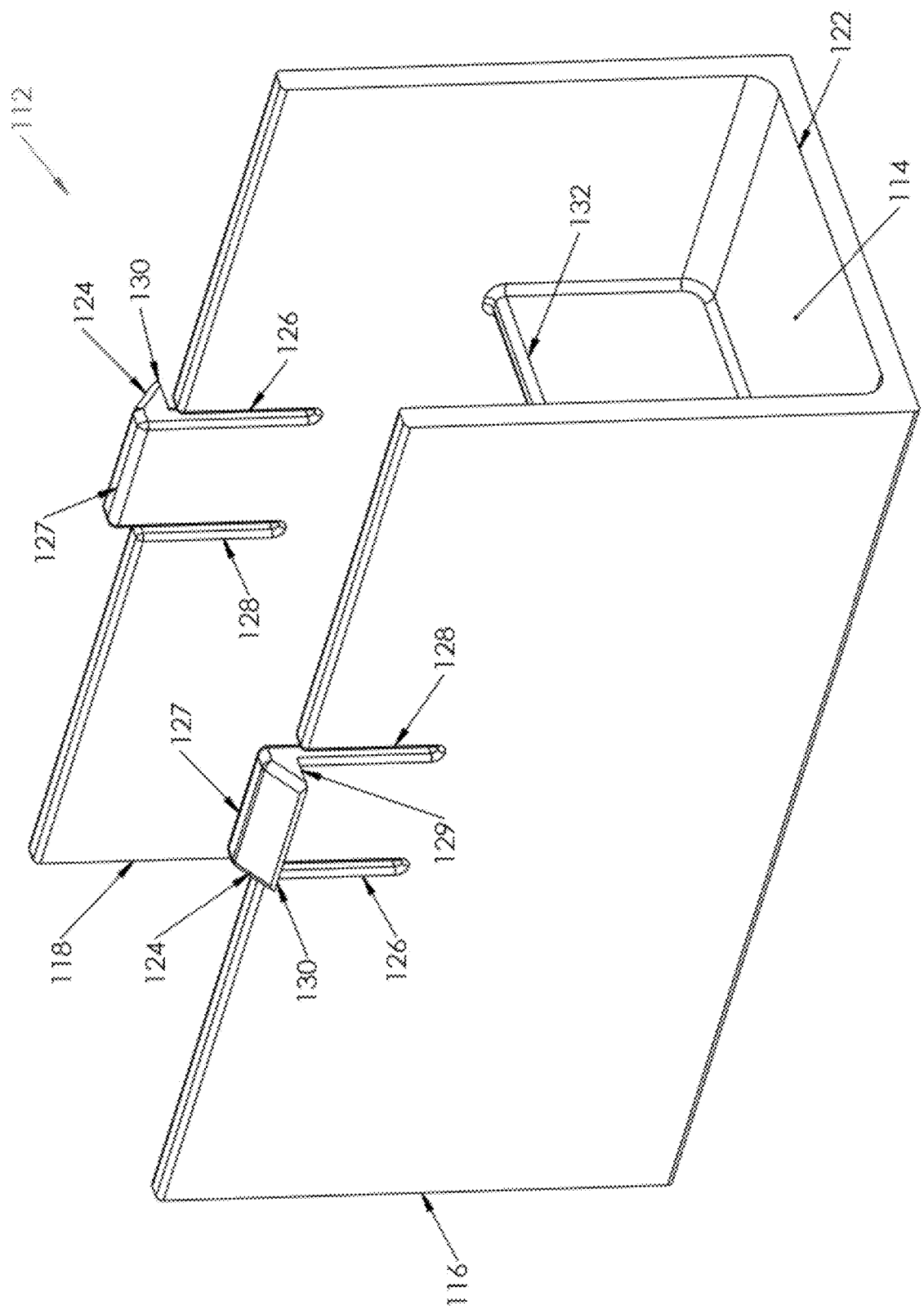
FIG. 2 is a perspective view of a lower portion of a connector used with the assembly shown in FIG. 1.
Figure 3:
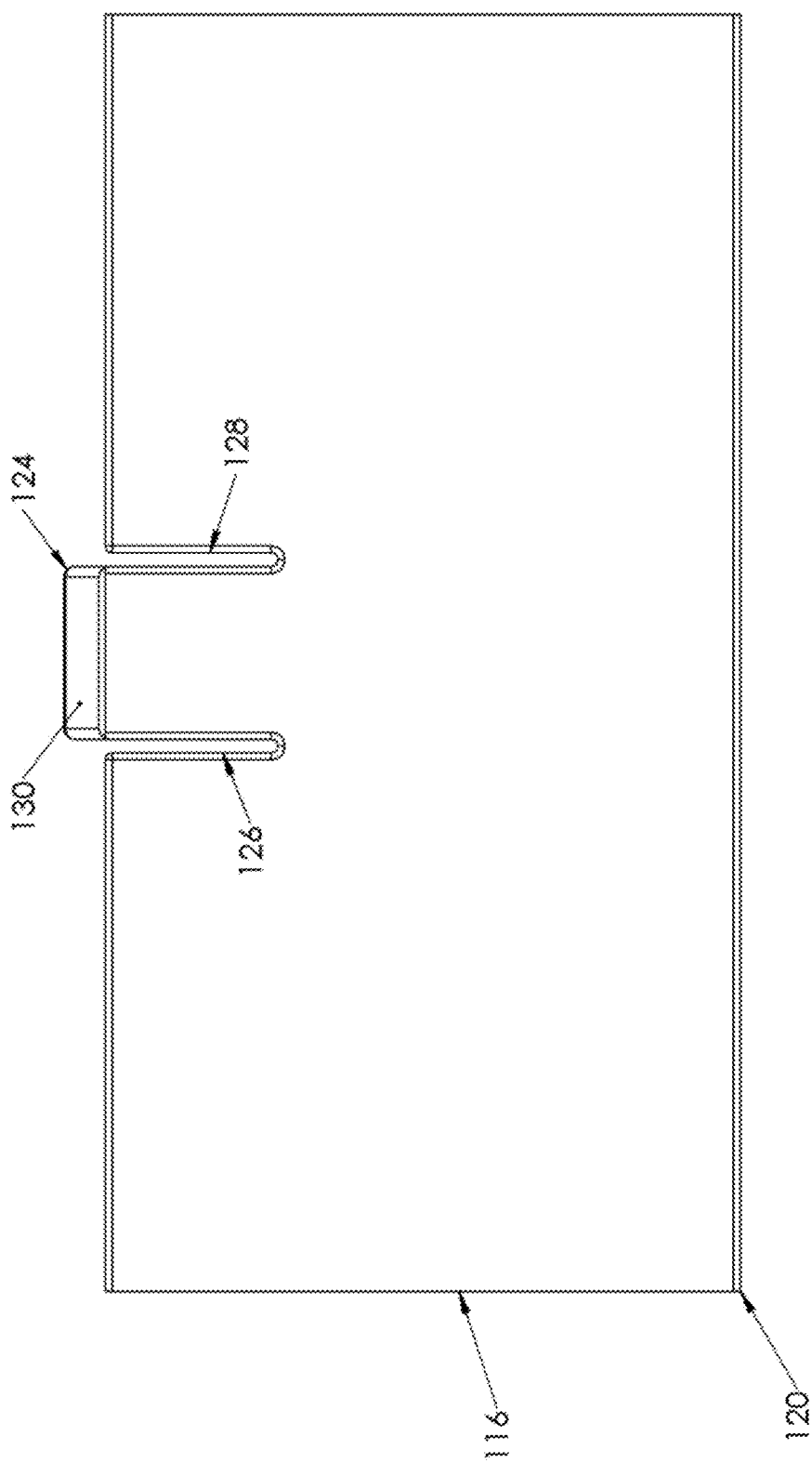
FIG. 3 is a side elevational view of the lower portion of the connector shown in FIG. 2.
Figure 4:
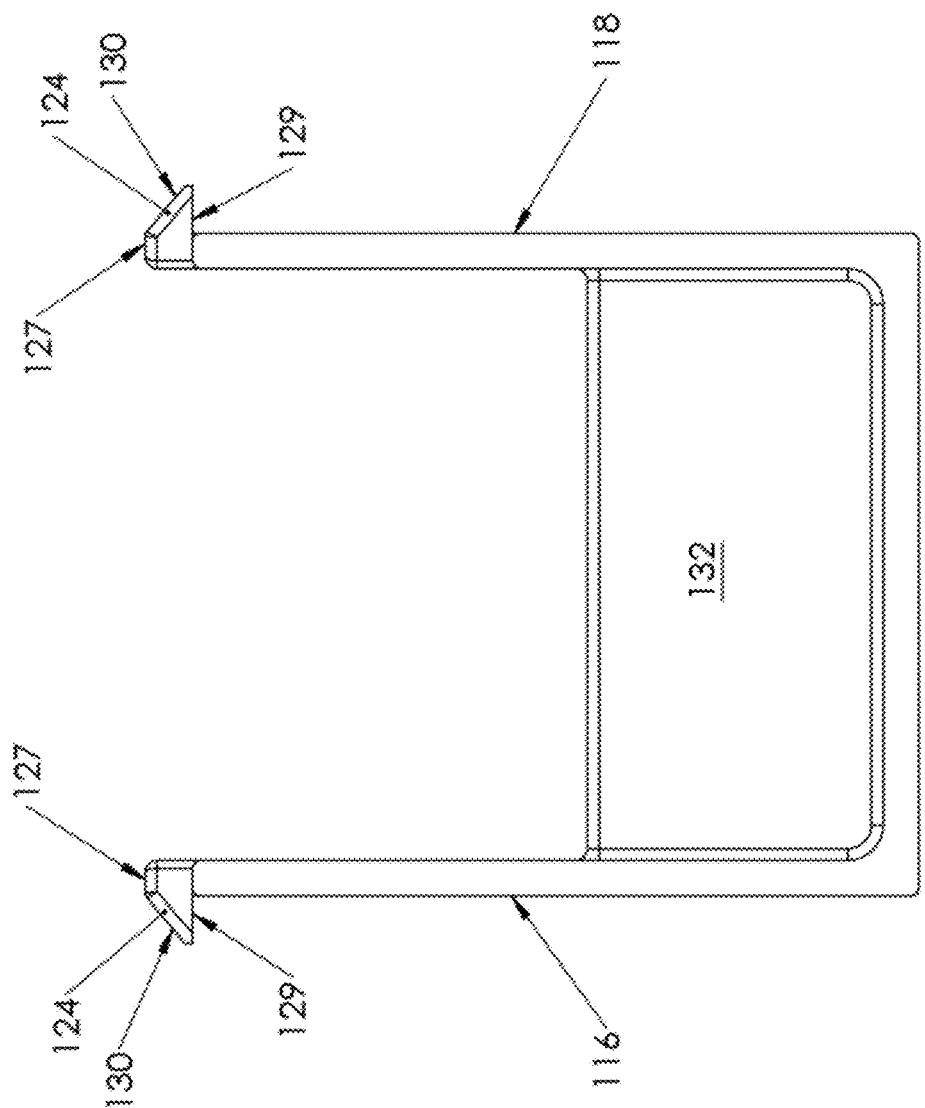
FIG. 4 is a front elevational view of the lower portion of the connector shown in FIG. 2.

In the drawings, like numerals indicate like elements throughout. Certain terminology is used herein for convenience only and is not to be taken as a limitation on the present invention. The terminology includes the words specifically mentioned, derivatives thereof and words of similar import. As used herein, the term "lower" is used to mean a direction closer to a wall on which the inventive frame is mounted and "upper" is used to mean a direction farther from the wall on which the inventive frame is mounted. A lower connector portion is mounted on the wall and an upper connector portion is attached to the lower connector portion. Other directional terms (i.e., top, bottom, upwardly, downwardly) are used relative to the direction of a base of each component described herein.

The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Referring to FIG. 1, the present invention is a modular frame assembly 100 that is attachable to a wall 50. Assembly 100 is selectively assemblable from a plurality of components as described herein. The components include a coupling connector 110, a tee connector 170, a corner connector 330, a vertical elongate member 440, and a horizontal elongate member 460. Assembly 100 can be used to vertically support the organization kit disclosed in U.S. Pat. No. 9,560,914 which issued on Feb. 7, 2017 and was invented by the present inventor, and which is incorporated herein by reference in its entirety. Assembly 100 can be mounted onto a wall 50 and the organization kit can be installed within the framework defined by assembly 100. When constructed, assembly 100 is typically rectangular in shape.

Referring now to FIGS. 2-9, coupling connector 110 is shown. Coupling connector 110 is used to join two co-linearly extending elongate members 440, 460 Coupling connector 110 can be used in a horizontal or a vertical direction.

Figure 5:
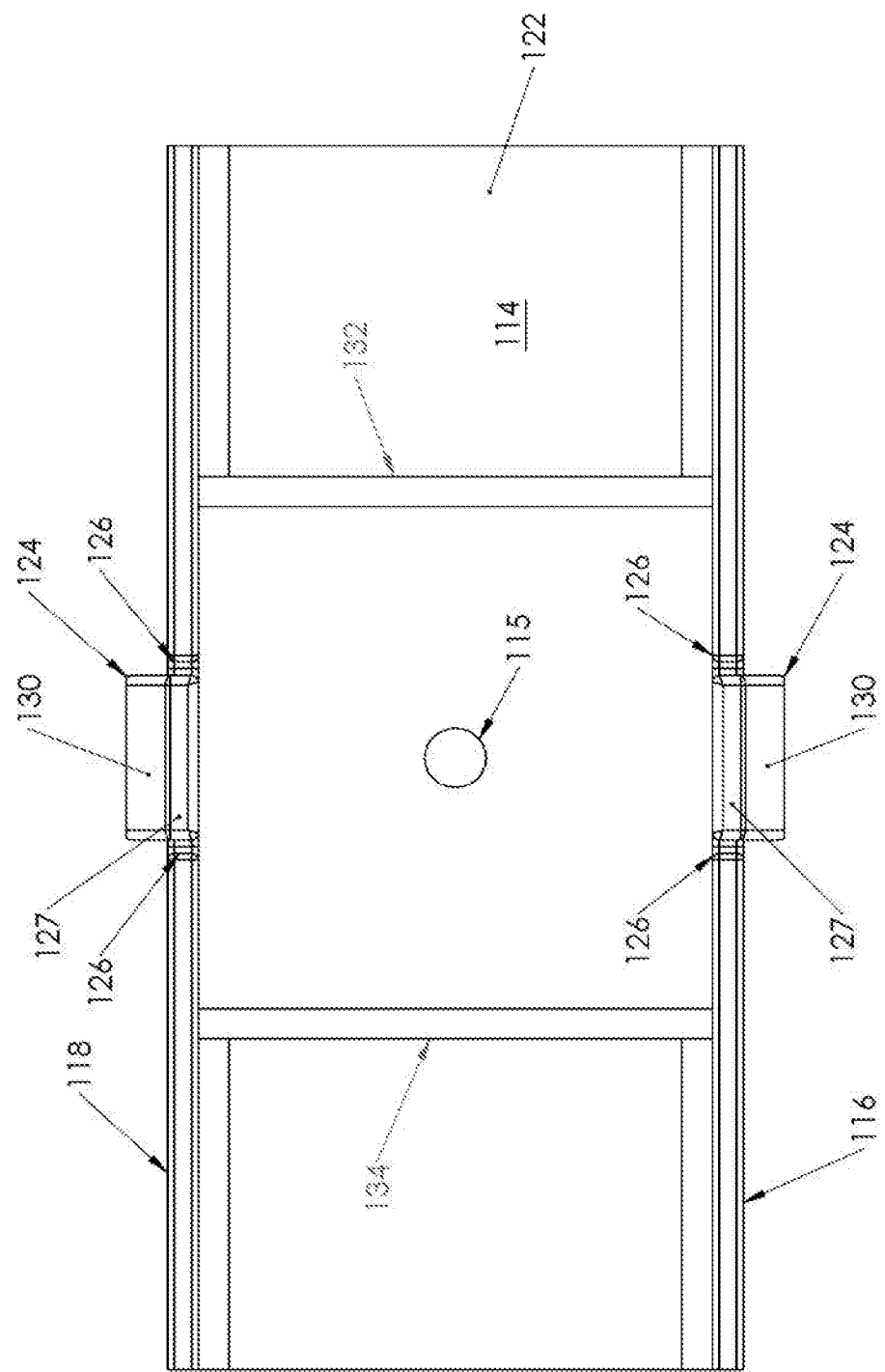
FIG. 5 is a top plan view of the lower portion of the connector shown in FIG. 2.
Figure 6:
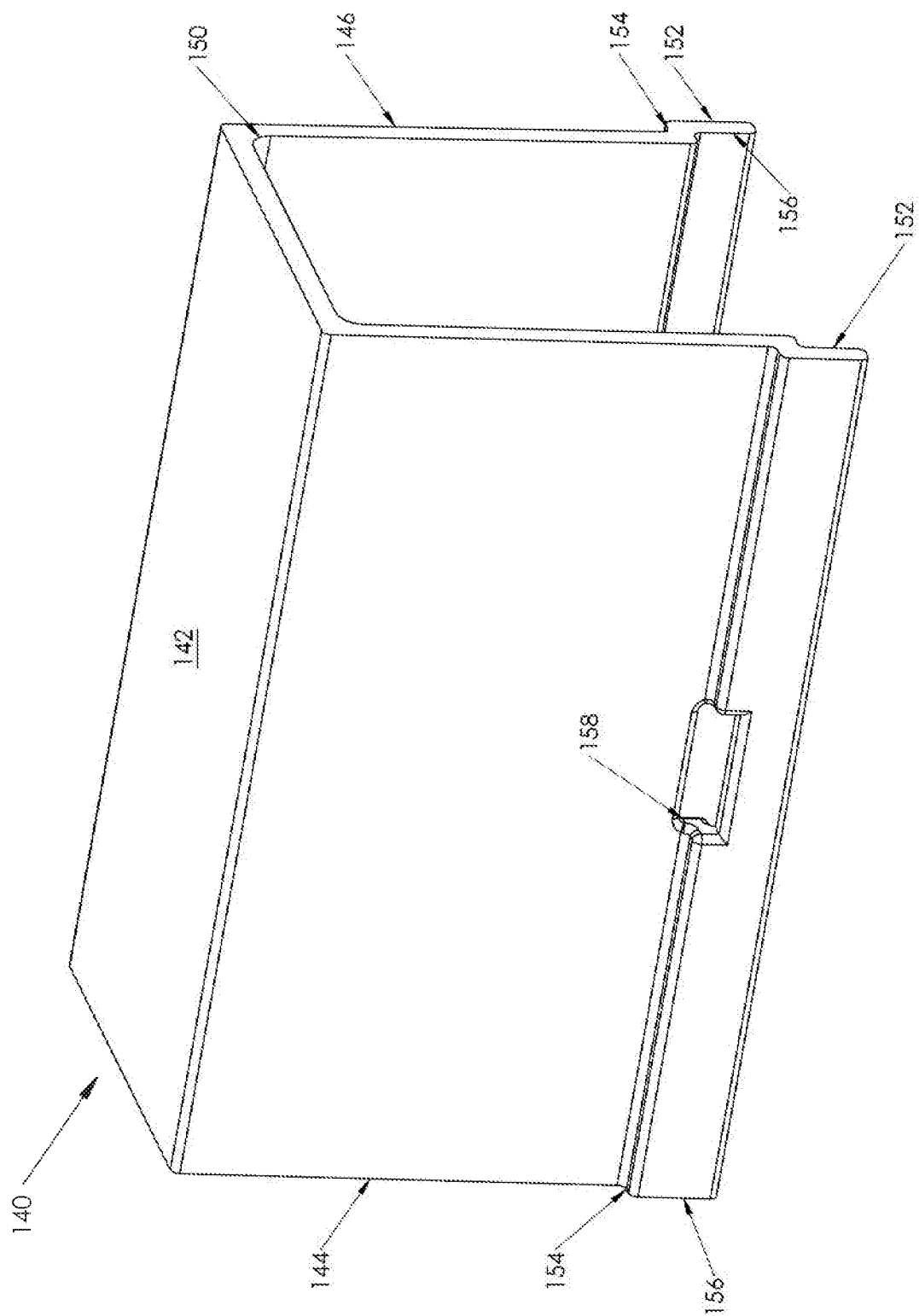
FIG. 6 is a perspective view of a top portion of the connector used with the assembly shown in FIG. 1.
Figure 7:
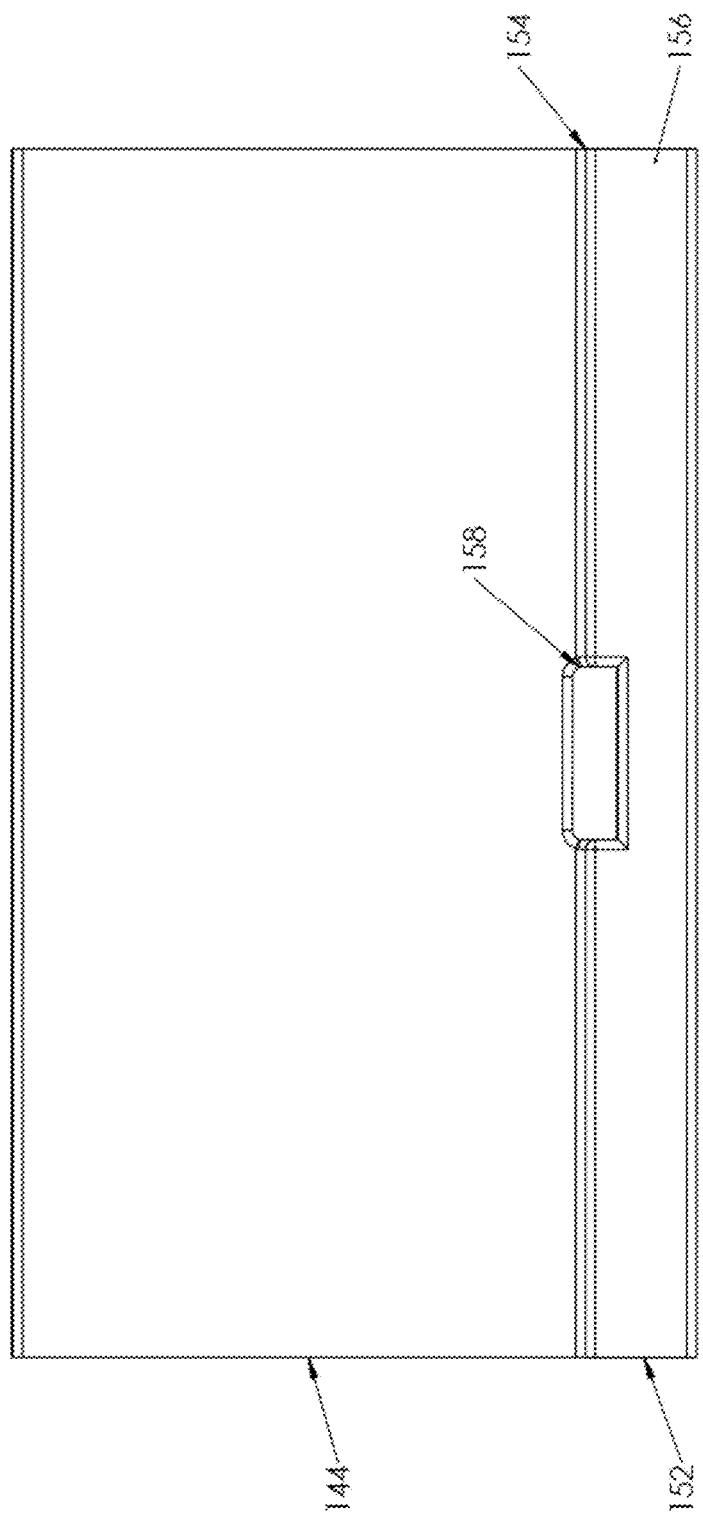
FIG. 7 is a side elevational view of the top portion of the connector shown in FIG. 6.
Figure 8:
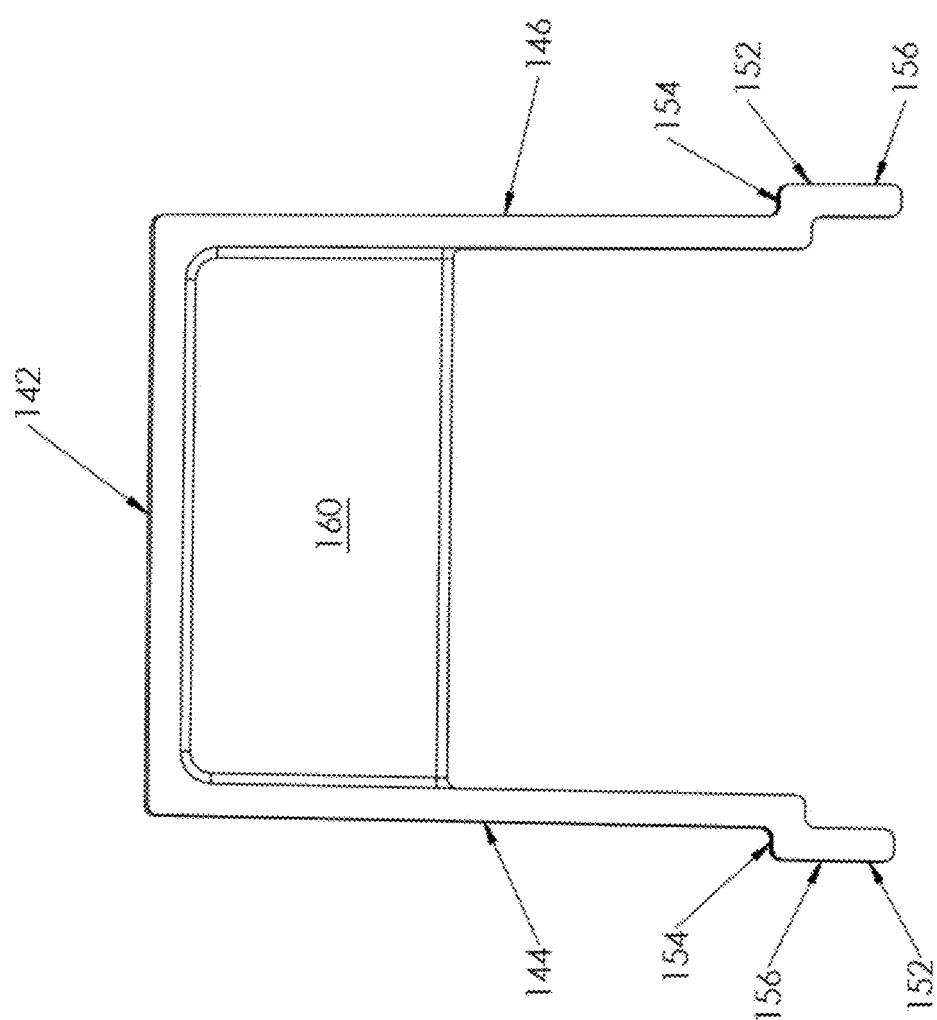
FIG. 8 is a front elevational view of the top portion of the connector shown in FIG. 6.
Figure 9:
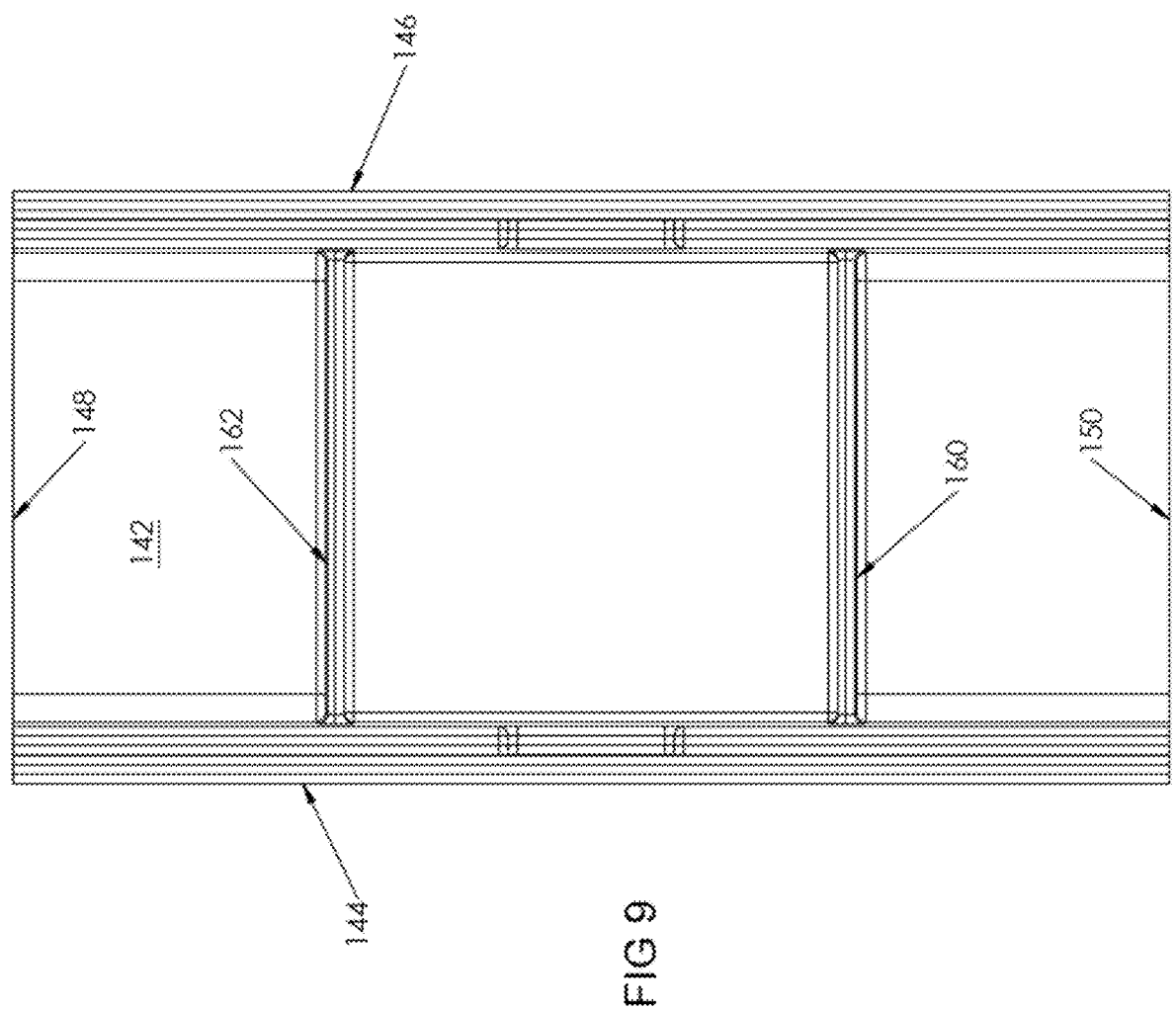
FIG. 9 is a bottom plan view of the top portion of the connector shown in FIG. 6.
Figure 10:
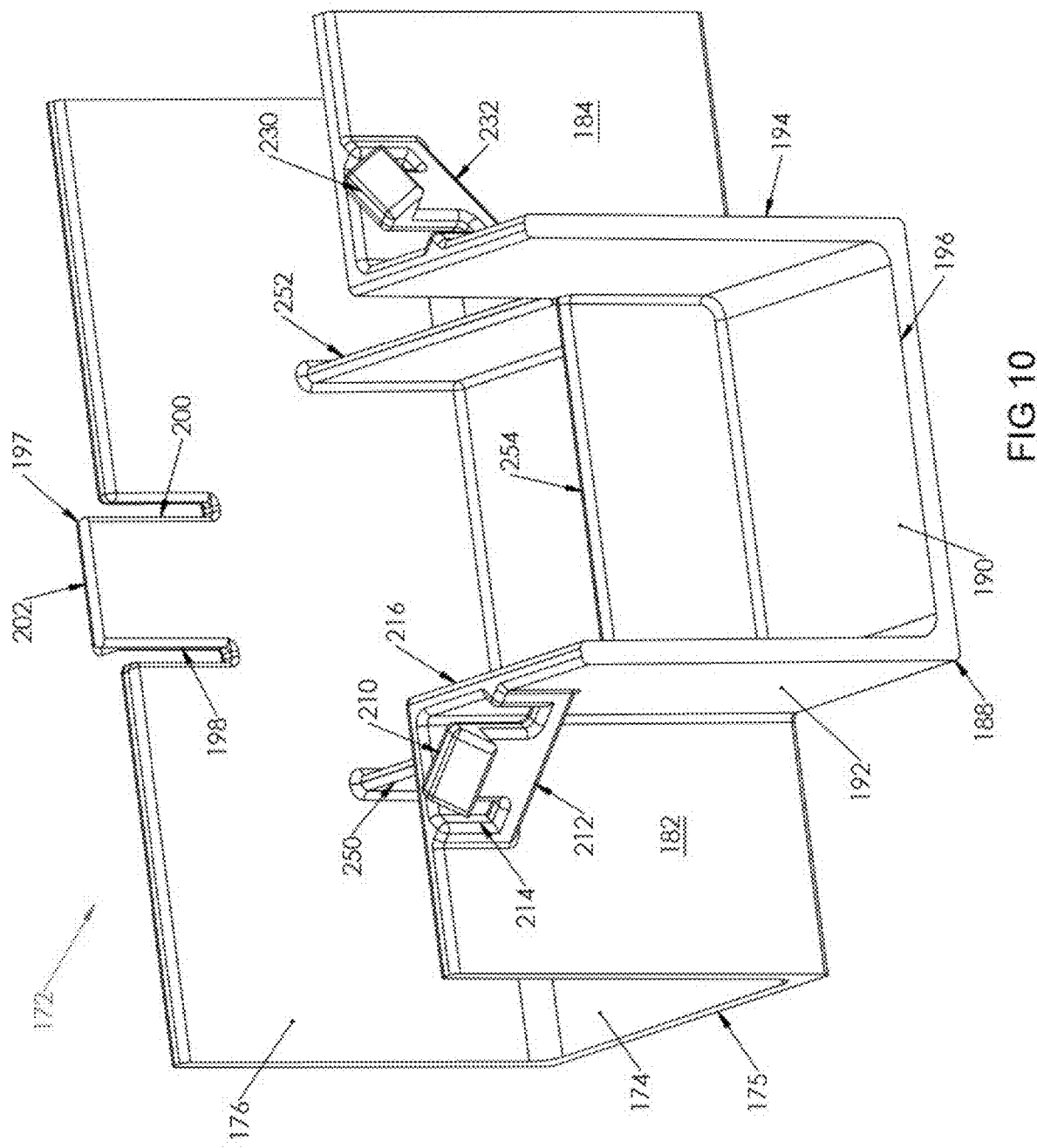
FIG. 10 is a perspective view of a lower portion of a tee connector used with the assembly shown in FIG. 1.
Figure 11:
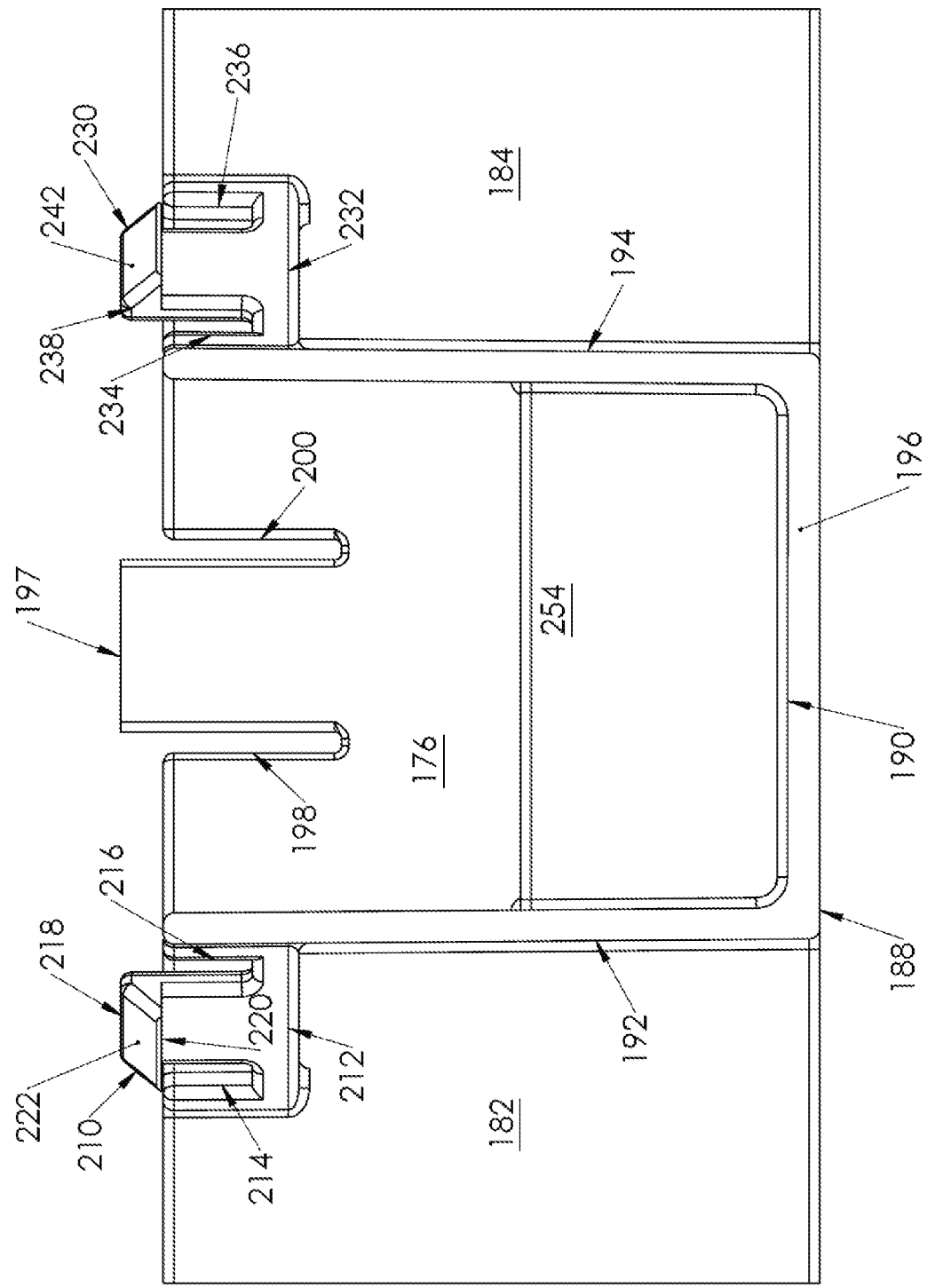
FIG. 11 is a front elevational view of the lower portion of the tee connector shown in FIG. 10.
Figure 12:
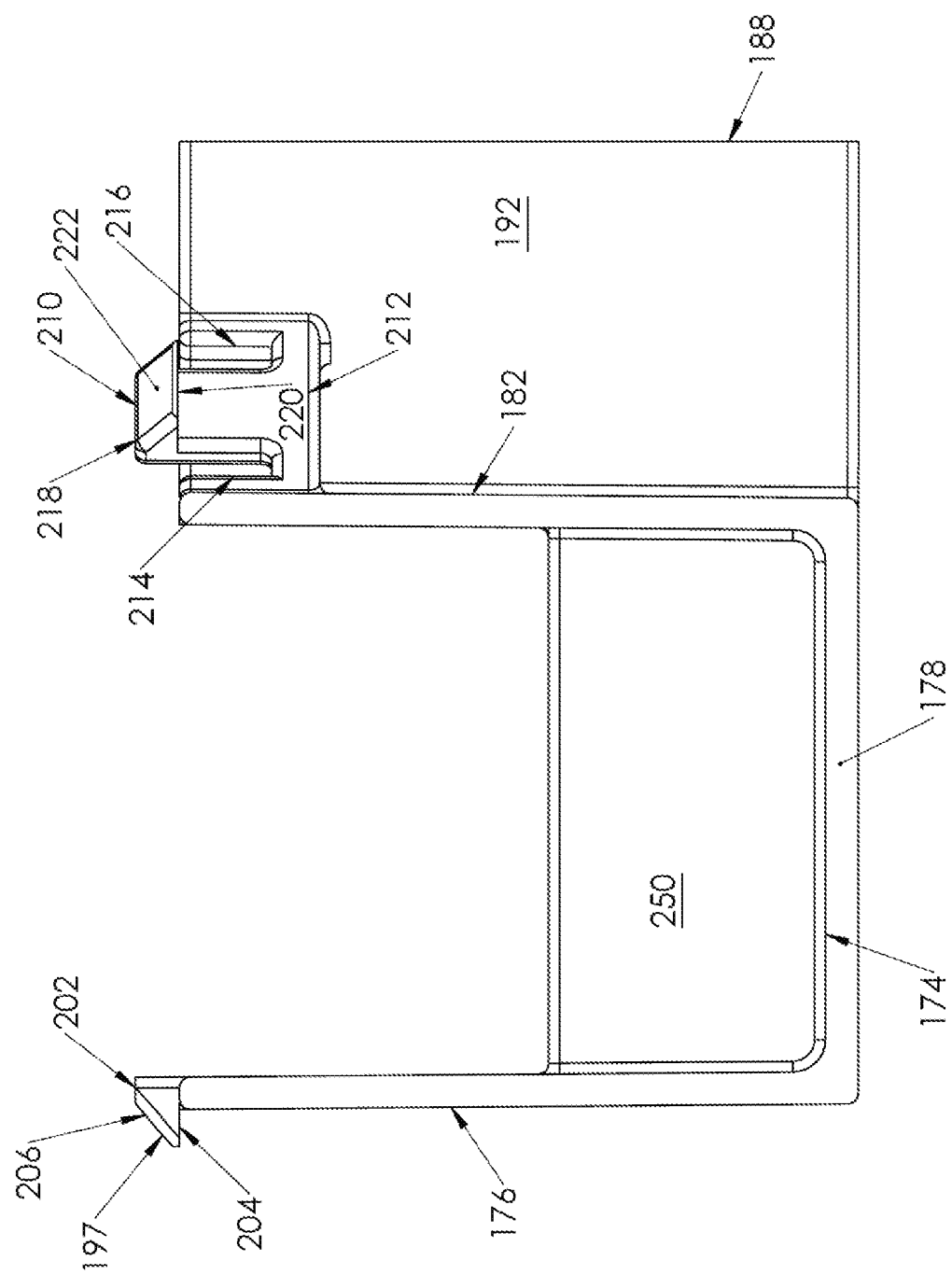
FIG. 12 is a left side elevational view of the lower portion of the tee connector shown in FIG. 10.
Figure 13:
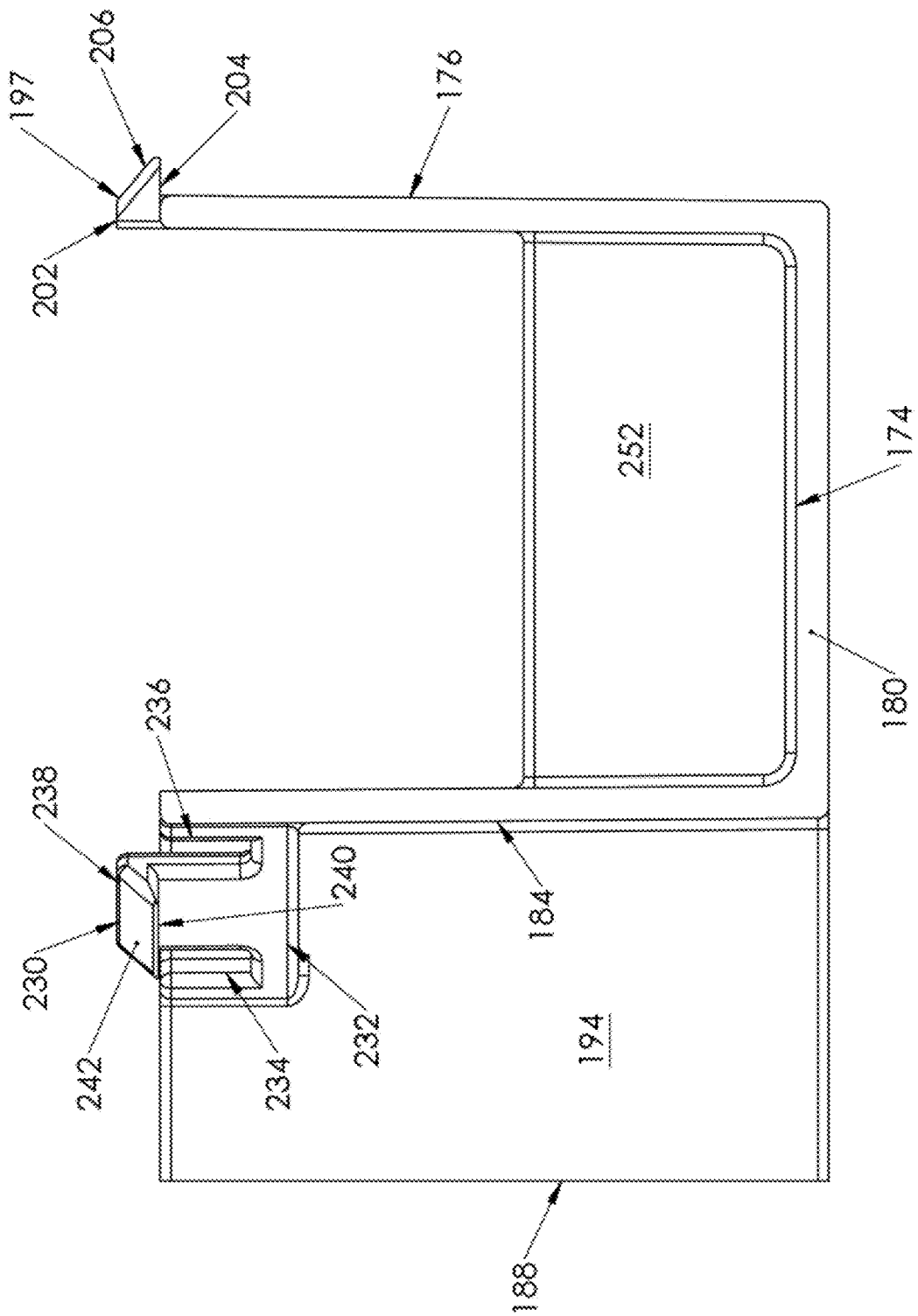
FIG. 13 is a right side elevational view of the lower portion of the tee connector shown in FIG. 10.

Coupling connector 110 includes a lower member 112 (shown in FIGS. 2-5) and an upper member 140 (shown in FIGS. 6-9). Lower member 112 includes a base 114 that is adapted to be placed against wall 50. Referring to FIG. 5, a generally centrally located through hole 115 extends through base 114. Through hole 115 is used to insert a mounting screw (not shown) therethrough to secure lower member 112 to wall 50.

A pair of opposing parallel side walls 116, 118 extends upwardly from base 114. Ends 120, 122 of base 114 are open. Each of side walls 116, 118 has a top central locking member 124 that extends upwardly from its respective side wall 116, 118 and is defined by parallel slots 126, 128 that extend from locking member 124 through respective side walls 116, 118 partially toward base 114 so that locking member 124 is able to flex relative to the remainder of its respective side wall 116, 118.

Locking member 124 is a tang that includes a top surface 127 extending outwardly from each respective side wall 116, 118, away from the other side wall 118, 116. A bottom surface 129 extends outwardly from each respective side wall 116, 118, away from the other side wall 118, 116 such that bottom surface 129 extends generally co-linearly with the top of its respective side wall 116, 118. Bottom surface 129 extends farther from side wall 116, 118 than surface 127. A sloped surface 130 connects top surface 127 and bottom surface 129, forming the tang.

A stopper 132 is a wall member that extends upwardly from base 114 between and generally orthogonally to side walls 116, 118. Stopper 132 is located between end 120 and locking member 124 and extends only partially upwardly along side walls 116, 118. Similarly, a stopper 134 is a wall member that extends upwardly from base 114 between and generally orthogonally to side walls 116, 118. Stopper 134 is located between end 122 and locking member 124 and extends only partially upwardly along side walls 116, 118.

Referring now to FIGS. 6-9, upper member 140 includes a base 142 that is adapted to be located away from wall 50.

A pair of opposing parallel side walls 144, 146 extends downwardly from base 142. Ends 148, 150 of base 142 are open.

Each side wall 144, 146 includes a lip 152 that extends the length thereof. Lip 152 includes an offset 154 that extends generally orthogonally from its respective side wall 144, 146 and a lip wall 156 that extends from offset 154 generally parallel to side walls 144, 146.

Lip 152 includes a longitudinal slot 158 located along the length of each side wall 144, 146 so that, when upper member 140 is disposed over lower member 112 and lips 152 extend over the top of respective side walls 116, 118, locking member 128 is insertable into slot 158 to releasably secure upper member 140 to lower member 112.

A stopper 160 is a wall member that extends downwardly from base 142 between and generally orthogonally to side walls 144, 146. Stopper 160 is located between end 148 and slot 158 and extends only partially downwardly along side walls 144, 146. Similarly, a stopper 162 is a wall member that extends downwardly from base 142 between and generally orthogonally to side walls 144, 146. Stopper 162 is located between end 146 and slot 158 and extends only partially downwardly along side walls 144, 146. When upper member 140 is secured to lower member 112, stopper 160 is co-planar with stopper 132 and stopper 162 is co-planar with stopper 134.

Referring now to FIGS. 10-19, a tee connector 170 is shown. Tee connector 170 is used to join two co-linearly extending elongate members 460, as well as an elongate member 440 extending orthogonally between the two co-linearly extending elongate members 460. Tee connector 170 can be used in a horizontal or a vertical direction.

Tee connector 170 includes a lower member 172 (shown in FIGS. 10-14) and an upper member 260 (shown in FIGS. 15-20). Lower member 172 includes a base 174 that is adapted to be placed against wall 50.

Figure 14:
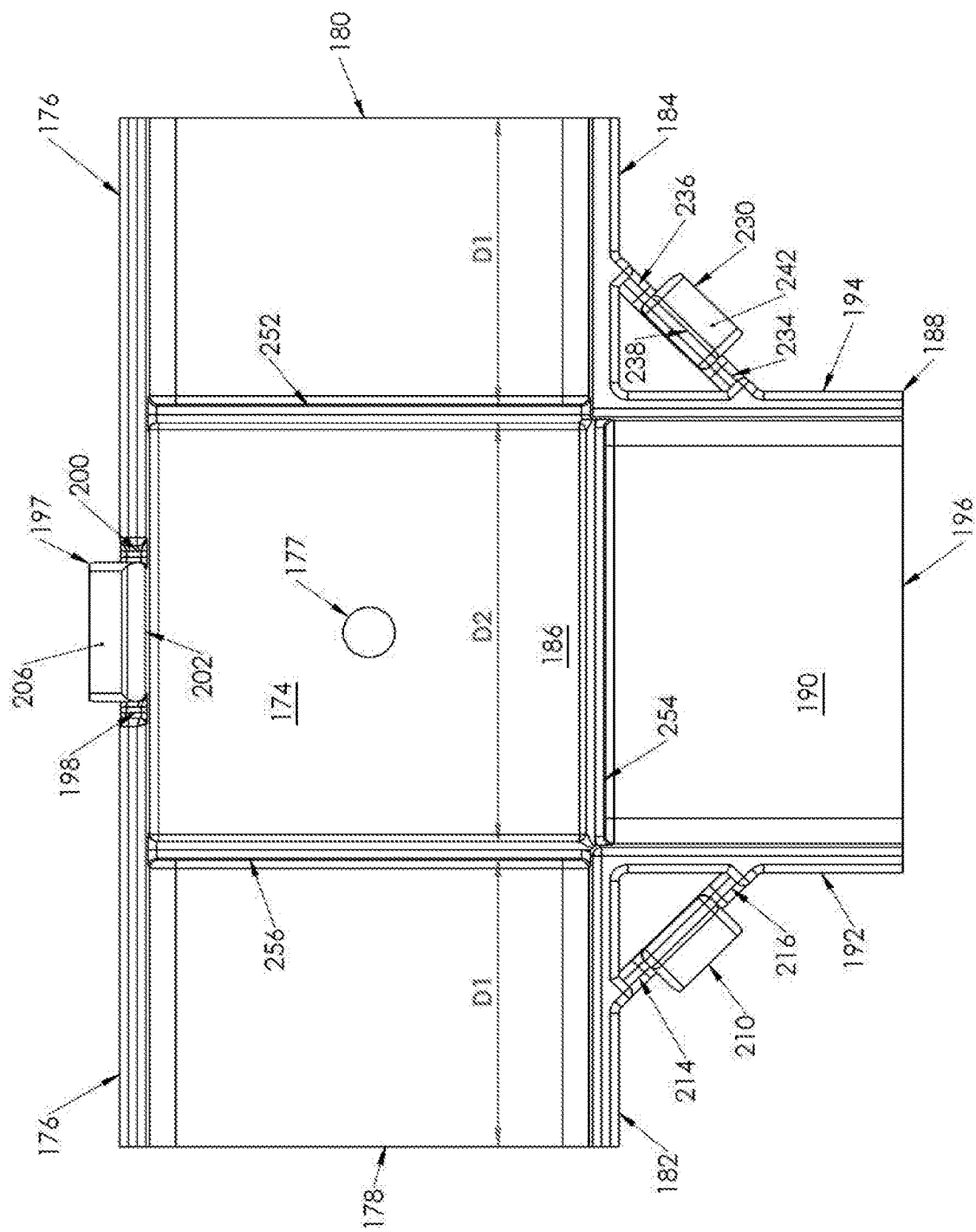
FIG. 14 is a top plan view of the lower portion of the tee connector shown in FIG. 10.
Figure 15:
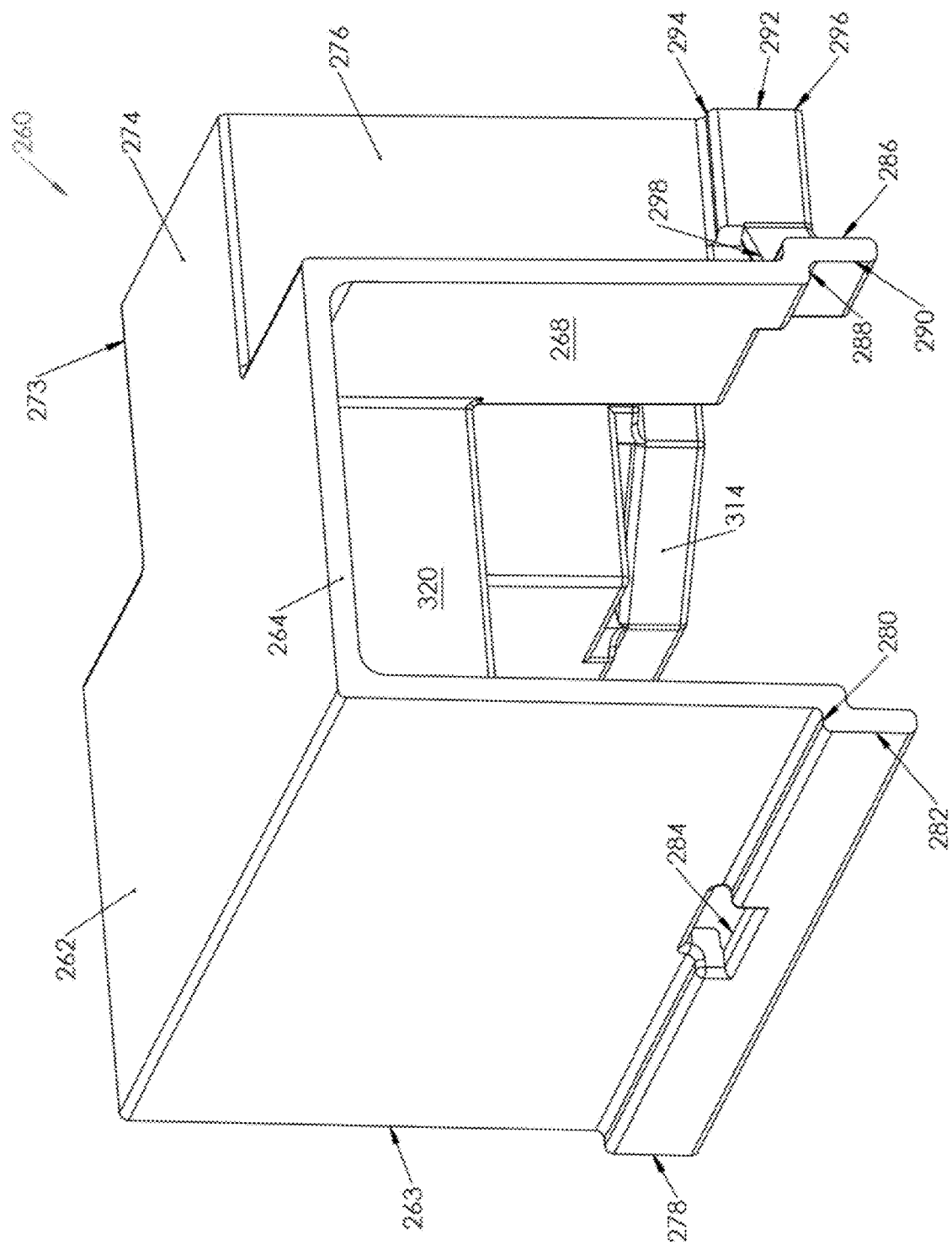
FIG. 15 is a perspective view of a top portion of the tee connector used with the assembly shown in FIG. 1.
Figure 16:
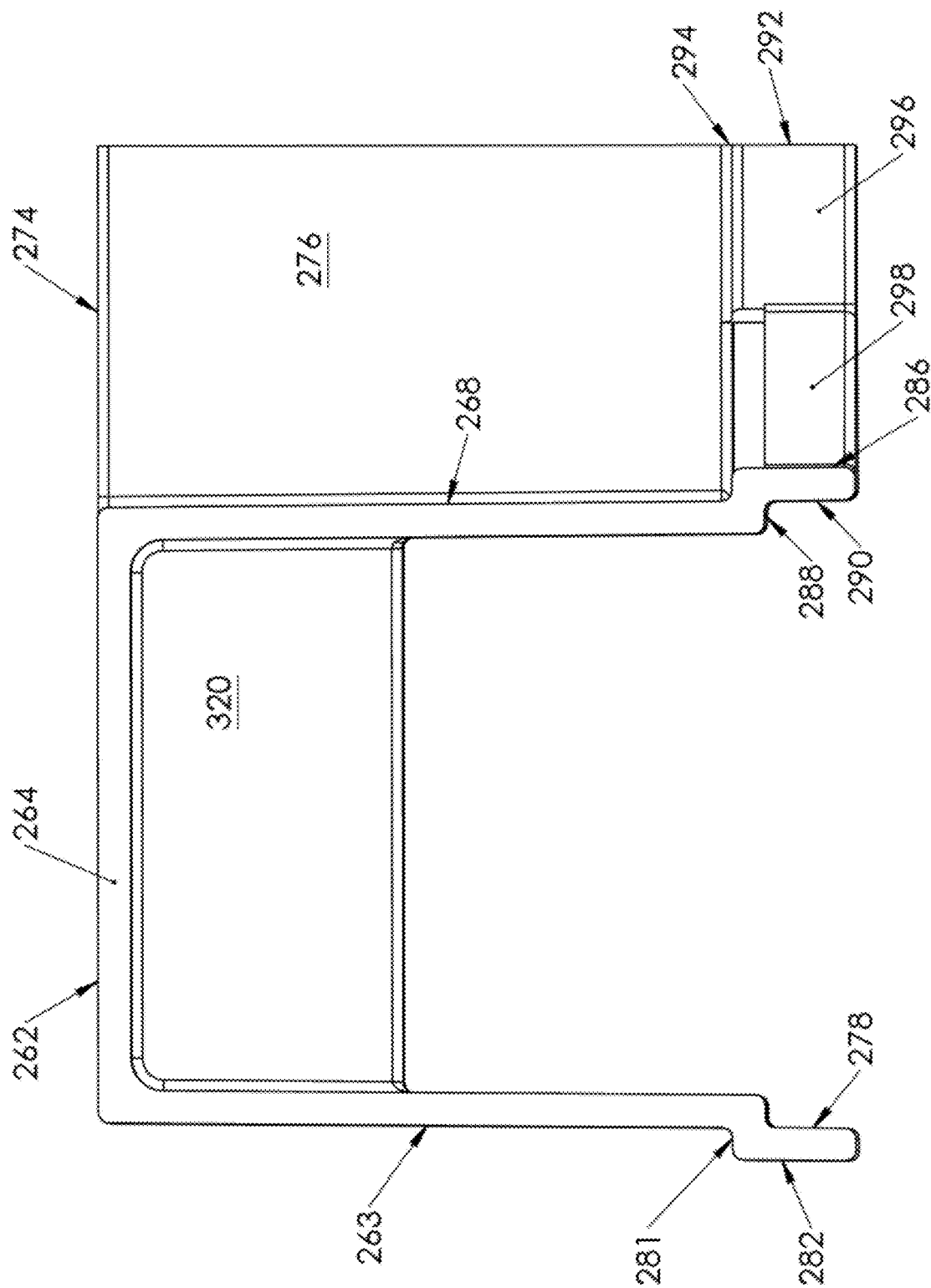
FIG. 16 is a left side elevational view of the top portion of the tee connector shown in FIG. 15.
Figure 17:
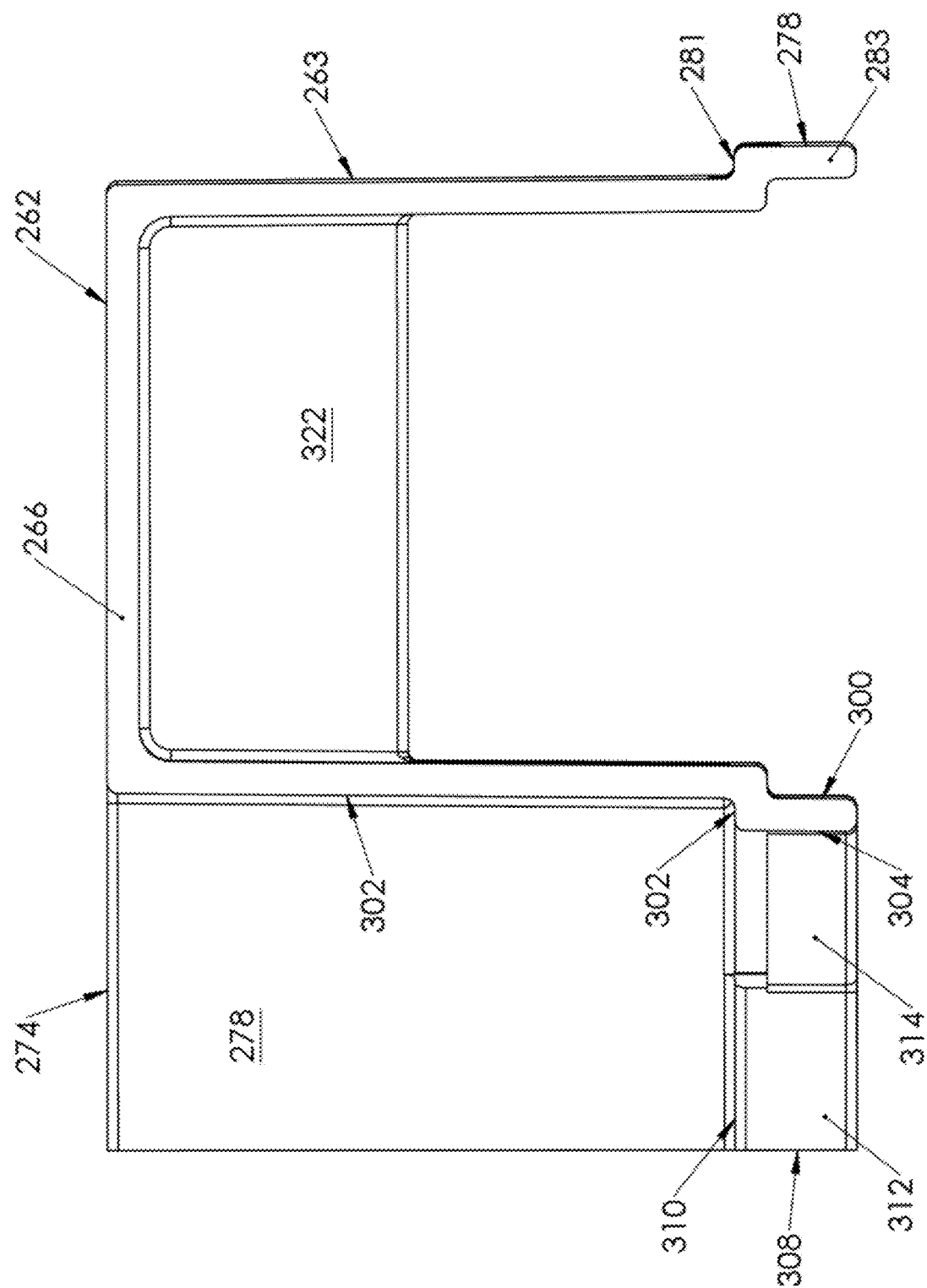
FIG. 17 is a right side elevational view of the top portion of the tee connector shown in FIG. 15.
Figure 18:
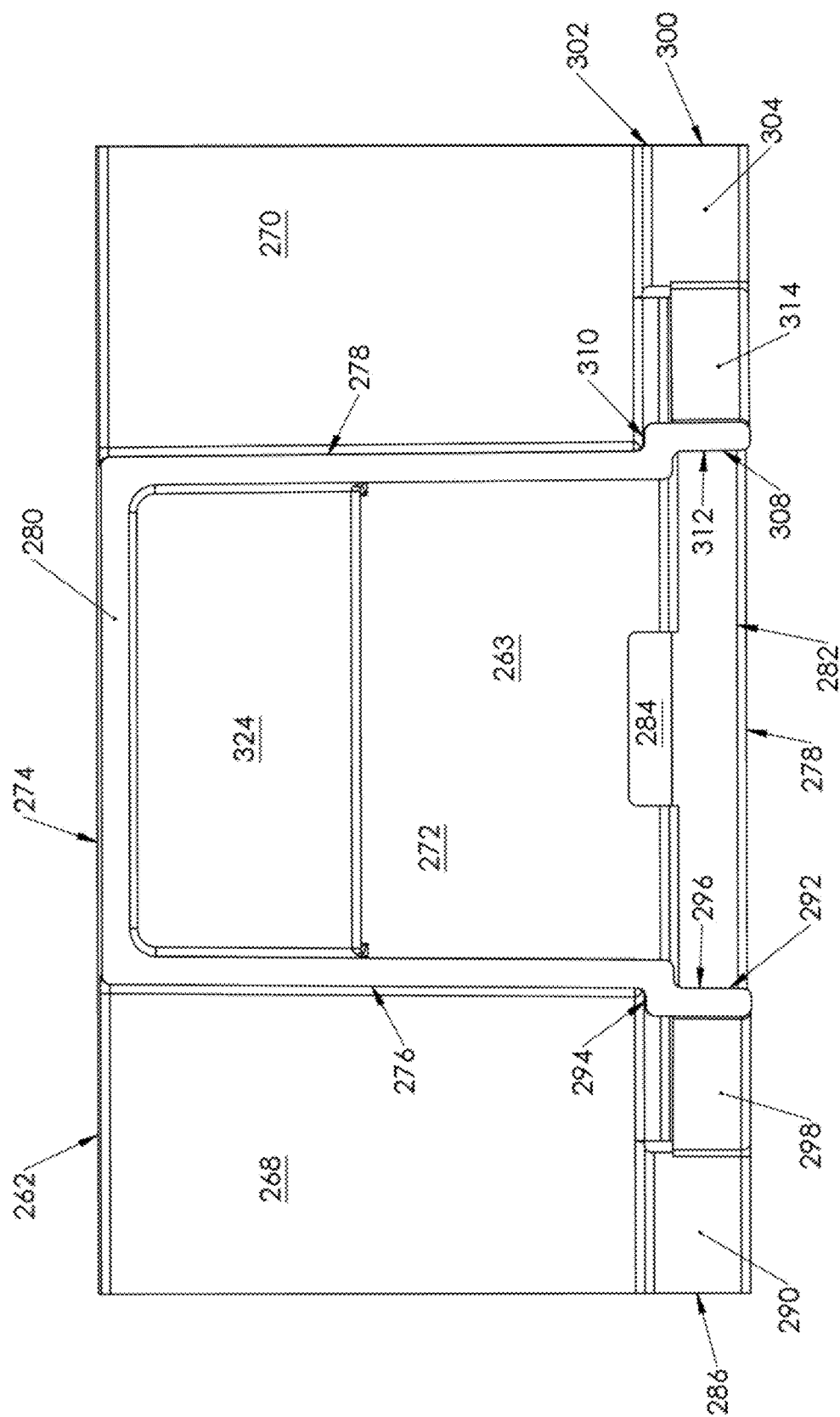
FIG. 18 is a front elevational view of the top portion of the tee connector shown in FIG. 15.
Figure 19:
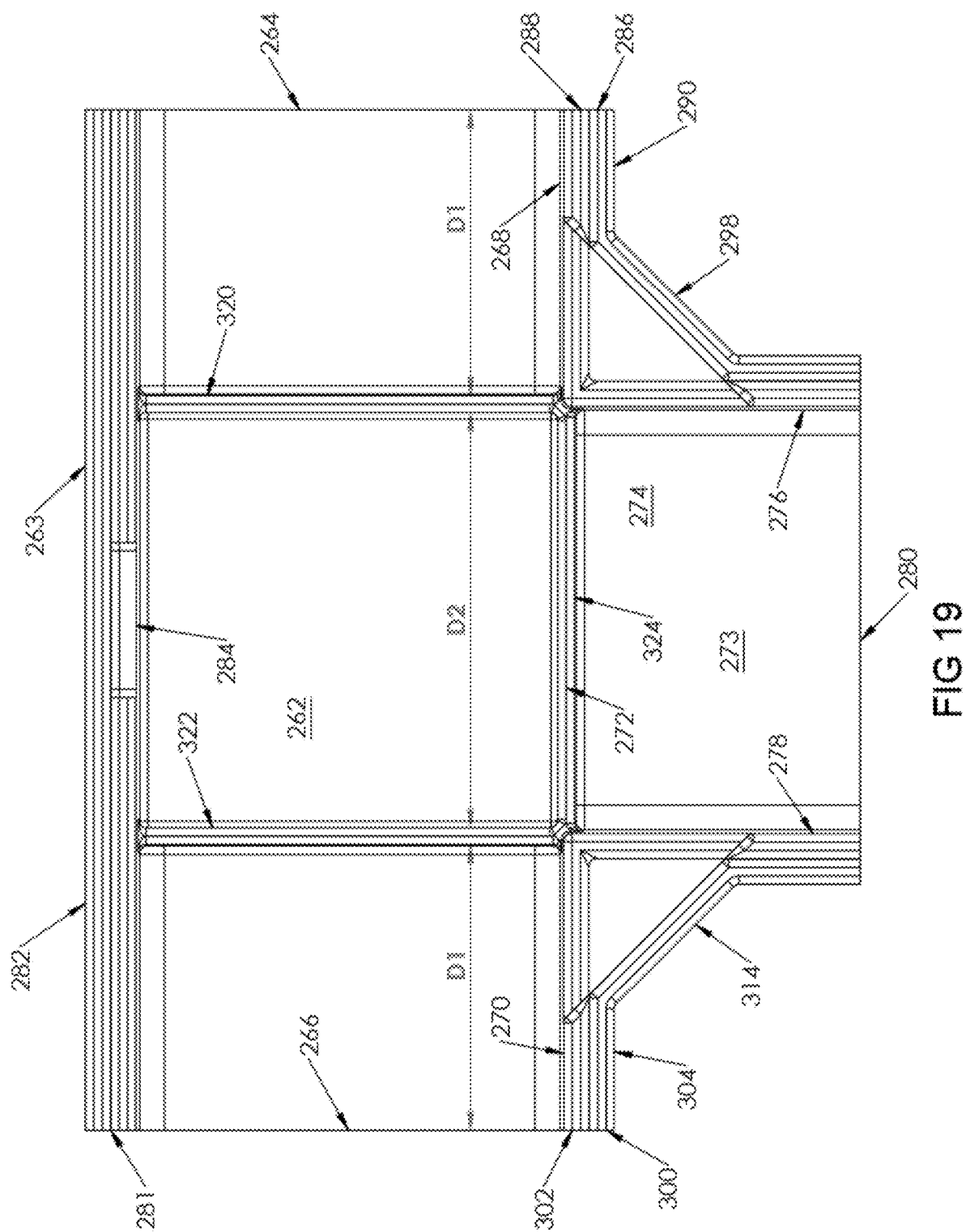
FIG. 19 is a bottom plan view of the top portion of the tee connector shown in FIG. 15.
Figure 20:
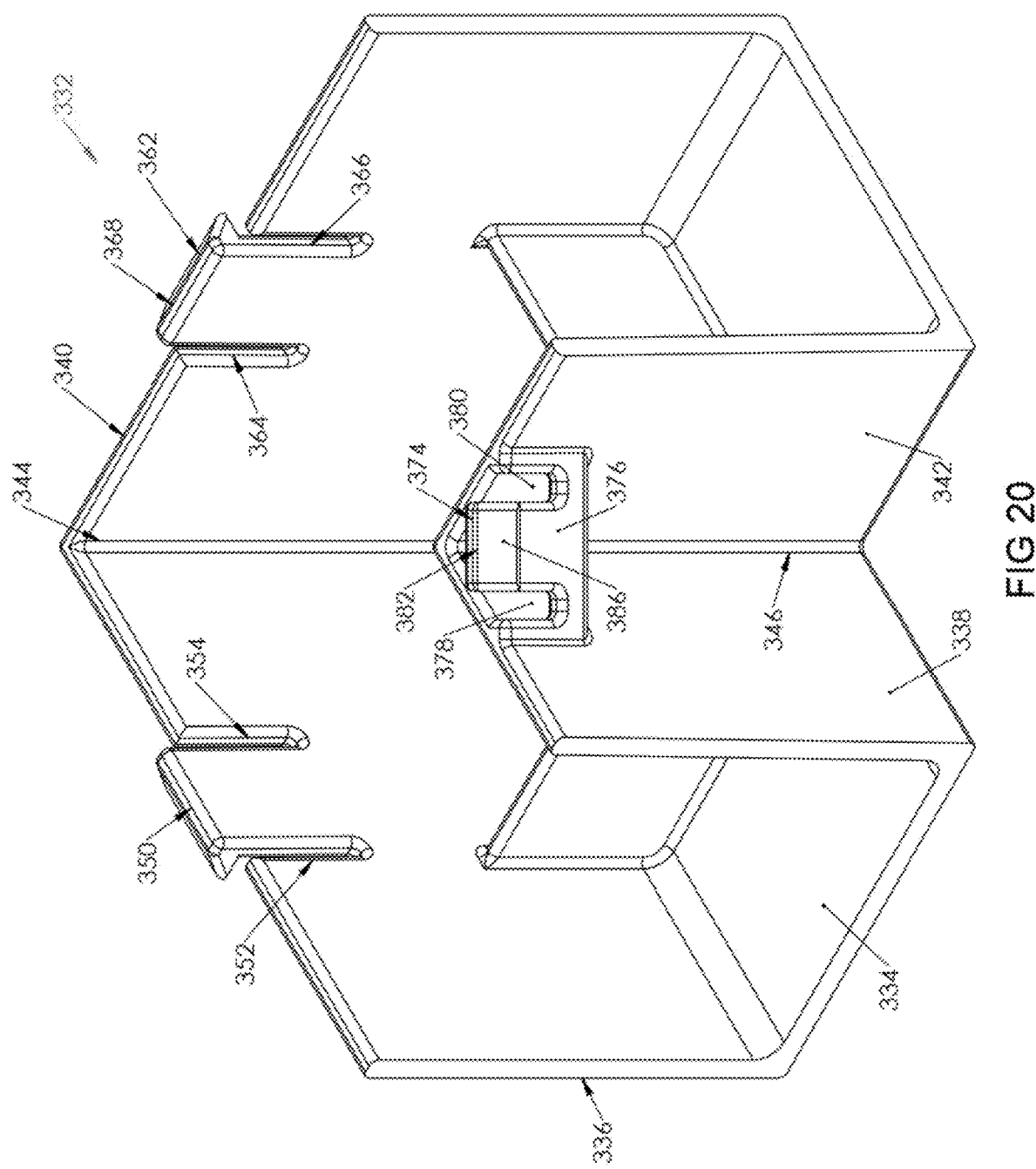
FIG. 20 is a perspective view of a bottom portion of a corner connector used with the assembly shown in FIG. 1.
Figure 21:
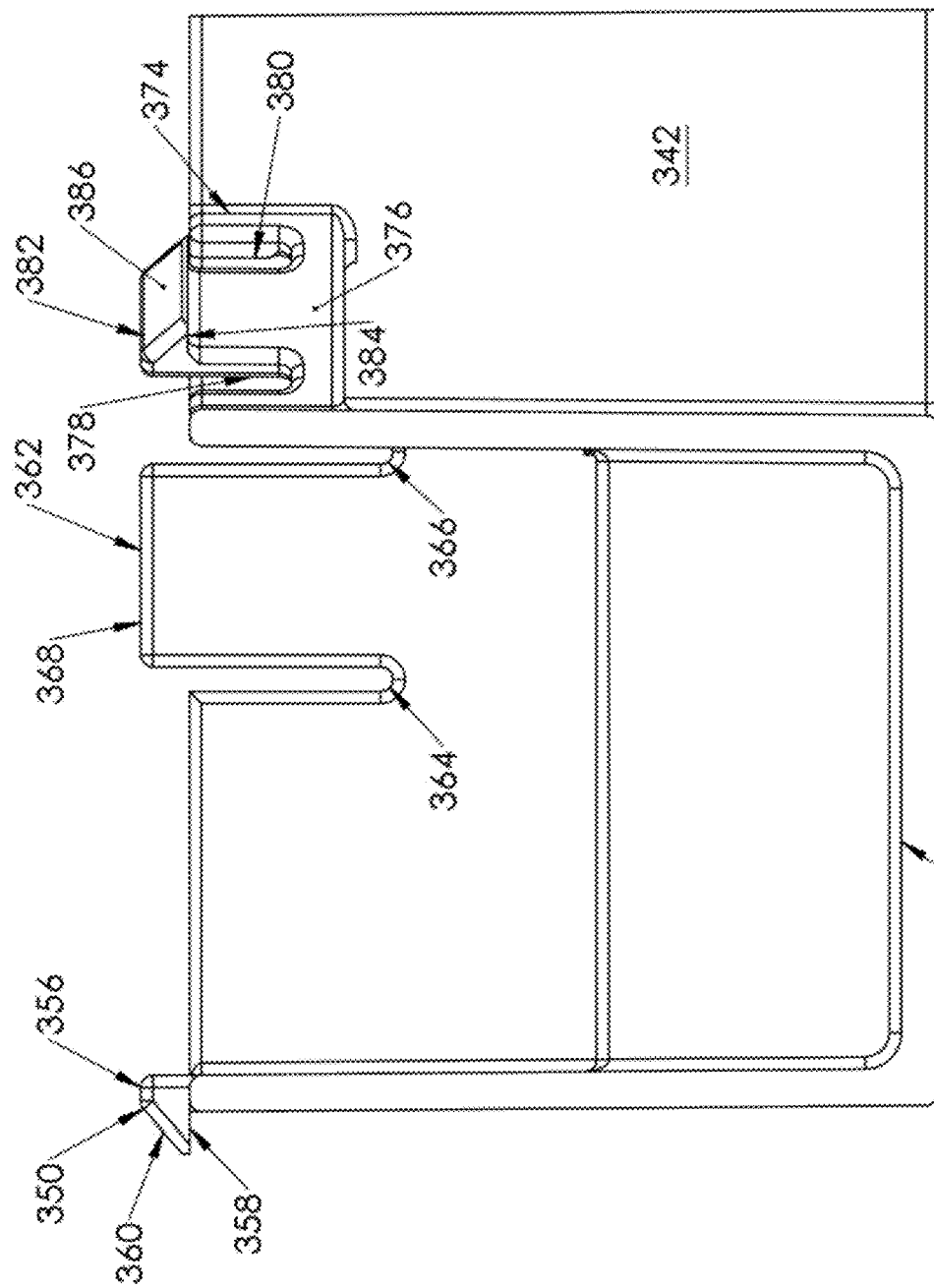
FIG. 21 is a left side elevational view of the bottom portion of the corner connector shown in FIG. 20.
Figure 22:
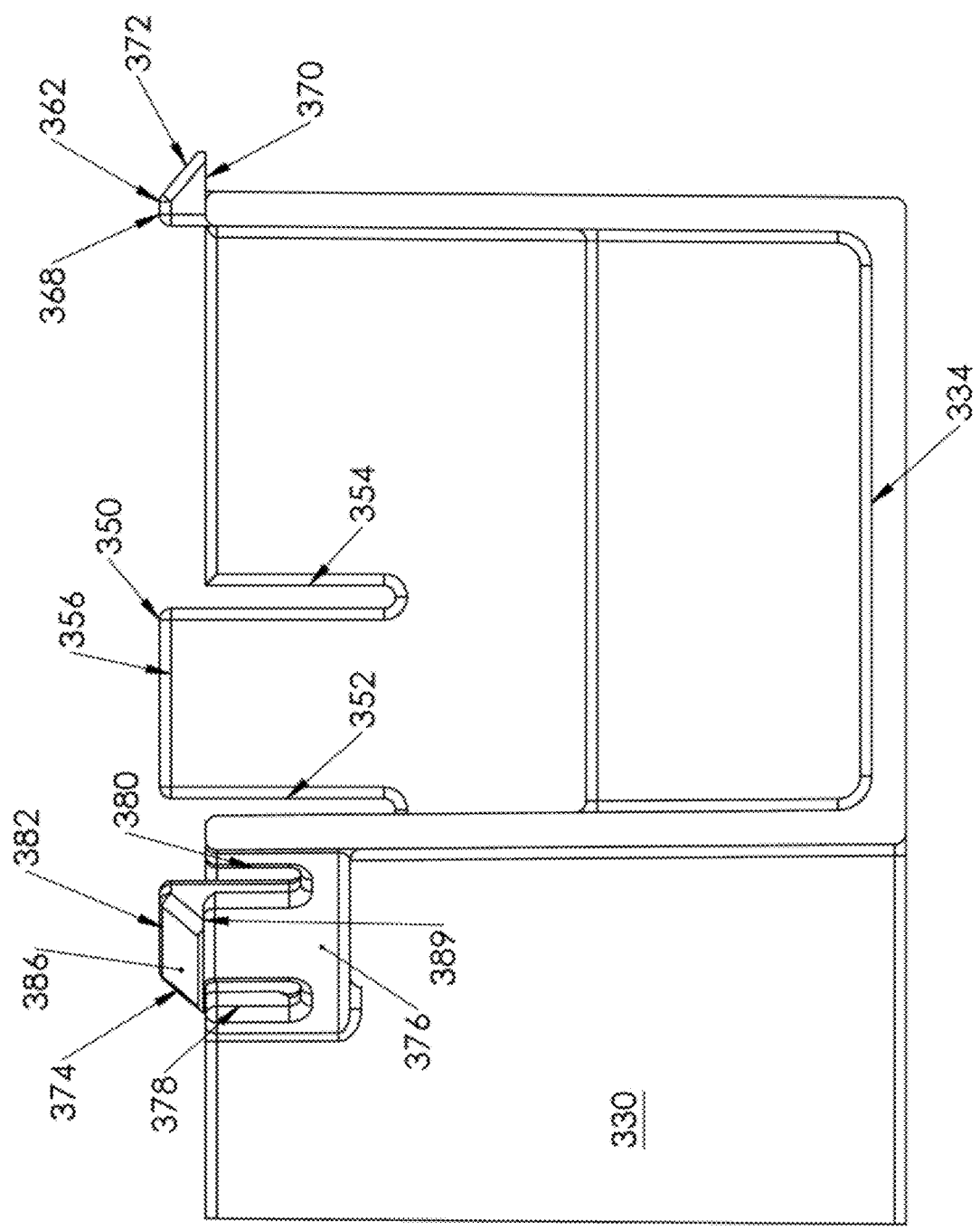
FIG. 22 is a right side elevational view of the bottom portion of the corner connector shown in FIG. 20.

A full length side wall 176 extends upwardly from base 174. Referring to FIG. 14, a generally centrally located through hole 177 extends through base 174. Through hole 177 is used to insert a mounting screw (not shown) therethrough to secure lower member 172 to wall 50.

Longitudinal ends 178, 180 of base 174 are open. Partial side walls 182, 184 extend from longitudinal ends 178, 180, respectively, parallel to side wall 176. Side walls 182, 184 extend in a common plane toward each other a distance D1, with a space 186 having a distance D2 separating side walls 182, 184 from each other.

A transverse portion 188 of lower member 172 includes a base 190 that extends co-planar with base 172 outwardly from side walls 182, 184 along distance D2. Transverse portion 188 is defined by base 190 and opposing parallel side walls 192, 194 that each extends upwardly from base 190. End 196 of base 190 is open. Side wall 192 terminates at side wall 182 and side wall 194 terminates at side wall 184.

Side wall 176 includes a top central locking member 197 that extends upwardly from side wall 176 and is defined by parallel slots 198, 200 that extend from locking member 176 through side wall 176 partially toward base 174 so that locking member 197 is able to flex relative to the remainder of side wall 176.

Locking member 196 is a tang that includes a top surface 202 extending outwardly from side wall 176, away from base 190. A bottom surface 204 extends outwardly from side wall 176, away from base 190 such that bottom surface 204 extends generally co-linearly with the top of side wall 176. Bottom surface 204 extends farther from side wall 176 than top surface 202. A sloped surface 206 connects top surface 202 and bottom surface 204, forming the tang.

A locking member 210 extends at an angle from side walls 182, 192. Locking member 210 is formed in a connecting piece 212 that connects a top portion of side wall 182 with a top portion of side wall 192. In an exemplary embodiment, the angle is about 45 degrees.

Locking member 210 extends upwardly from connecting piece 212 above both of side walls 182, 192 and is defined by parallel slots 214, 216 that extend from locking member 210 partially through connecting piece 212 so that locking member 210 is able to flex relative to the remainder of connecting piece 212.

Locking member 210 is a tang that includes a top surface 218 extending outwardly from connecting piece 212, away from side walls 182, 192. A bottom surface 220 extends outwardly from connecting piece 212, away from side walls 182, 192 such that bottom surface 220 extends generally co-linearly with the top of side walls 182, 192. Bottom surface 220 extends farther from connecting piece 212 than top surface 218. A sloped surface 222 connects top surface 218 and bottom surface 220, forming the tang.

Similarly, a locking member 230 extends at an angle from side walls 184, 194. Locking member 230 is formed in a connecting piece 232 that connects a top portion of side wall 184 with a top portion of side wall 194. In an exemplary embodiment, the angle is about 45 degrees.

Locking member 230 extends upwardly from connecting piece 232 above both of side walls 184, 194 and is defined by parallel slots 234, 236 that extend from locking member 230 partially through connecting piece 232 so that locking member 230 is able to flex relative to the remainder of connecting piece 232.

Locking member 230 is a tang that includes a top surface 238 extending outwardly from connecting piece 232, away from side walls 184, 194. A bottom surface 240 extends outwardly from connecting piece 232, away from side walls 184, 194 such that bottom surface 240 extends generally co-linearly with the top of side walls 184, 194. Bottom surface 240 extends farther from connecting piece 232 than top surface 238. A sloped surface 242 connects top surface 238 and bottom surface 240, forming the tang.

A stopper 250 is a wall member that extends upwardly from base 174 between and generally orthogonally to side walls 176, 182, co-planar with side wall 192. Stopper 250 is located between end 178 and locking member 196 and extends only partially upwardly along side walls 176, 182. Similarly, a stopper 252 is a wall member that extends upwardly from base 174 between and generally orthogonally to side walls 176, 184, co-planar with side wall 194. Stopper 252 is located between end 180 and locking member 196 and extends only partially upwardly along side walls 176, 184.

A stopper 254 is a wall member that extends upwardly from the junction of base 174 and base 190, and extends co-planar with side walls 182, 184. Stopper 254 extends only partially upwardly along side walls 182, 184.

Referring to FIGS. 15-19, upper member 260 includes a base 262 that is adapted to be located away from wall 50. A full length side wall 263 extends downwardly from base 262.

Longitudinal ends 264, 266 of base 262 are open. Partial side walls 268, 270 extend from longitudinal ends 264, 266, respectively, parallel to side wall 263. Side walls 268, 270 extend in a common plane toward each other a distance D1, with a space 272 having a distance D2 separating side walls 268, 270 from each other.

A transverse portion 273 of upper member 260 includes a base 274 that extends co-planar with base 262 outwardly from side walls 268, 270 along distance D2. Transverse portion 273 is defined by base 274 and opposing parallel side walls 276, 278 that each extends downwardly from base 274. End 280 of base 274 is open. Side wall 276 terminates at side wall 268 and side wall 276 terminates at side wall 270.

Side wall 263 includes a lip 278 that extends the length thereof. Lip 278 includes an offset 280 that extends generally orthogonally from side wall 262 and a lip wall 282 that extends from offset 280 generally parallel to side wall 262.

Lip 278 includes a longitudinal slot 284 located along the length of side wall 262 so that, when upper member 260 is disposed over lower member 172 and lip 278 extends over the top of side wall 262, locking member 196 is insertable into slot 284 to releasably secure upper member 260 to lower member 172.

Side wall 268 includes a lip 286 that extends from end 264 partially along the length of side wall 268. Lip 286 includes an offset 288 that extends generally orthogonally from side wall 268 and a lip 290 that extends from offset 288 generally parallel to side wall 268.

Similarly, side wall 276 includes a lip 292 that extends from end 280 partially along the length of side wall 276. Lip 292 includes an offset 294 that extends generally orthogonally from side wall 276 and a lip wall 296 that extends from offset 294 generally parallel to side wall 276.

A connector piece 298 extends at an angle between lip walls 290, 296. In an exemplary embodiment, connector piece 298 extends at an angle of about 45 degrees. When upper member 260 is disposed over lower member 172 and lips 286, 292 extend over the top of side walls 182, 192, locking member 210 is insertable behind connector piece 298 to releasably secure upper member 260 to lower member 172.

Additionally, side wall 270 includes a lip 300 that extends from end 266 partially along the length of side wall 270. Lip 300 includes an offset 302 that extends generally orthogonally from side wall 278 and a lip wall 304 that extends from offset 302 generally parallel to side wall 270.

Similarly, side wall 278 includes a lip 308 that extends from end 282 partially along the length of side wall 278. Lip 308 includes an offset 310 that extends generally orthogonally from side wall 280 and a lip wall 312 that extends from offset 310 generally parallel to side wall 278.

A connector piece 314 extends at an angle between lip walls 304, 312. In an exemplary embodiment, connector piece 314 extends at an angle of about 45 degrees. When upper member 260 is disposed over lower member 172 and lips 300, 308 extend over the top of side walls 184, 194, locking member 230 is insertable behind connector piece 314 to releasably secure upper member 260 to lower member 172.

A stopper 320 is a wall member that extends downwardly from base 262 between and generally orthogonally to side walls 263, 268, co-planar with side wall 276. Stopper 320 is located between end 264 and base 274 and extends only partially downwardly along side walls 263, 268. Similarly, a stopper 322 is a wall member that extends downwardly from base 262 between and generally orthogonally to side walls 263, 270, co-planar with side wall 278. Stopper 322 is located between end 266 and base 274 and extends only partially downwardly along side walls 263, 268.

A stopper 324 is a wall member that extends downwardly from the junction of base 262 and base 274, and extends co-planar with side walls 268, 270. Stopper 324 extends only partially downwardly along side walls 268, 270.

Referring to FIGS. 20-28, a corner connector 330 is shown. Corner connector 330 is used to join two perpendicularly extending elongate members 440, 460. Corner connector 330 can be oriented in any one of four orthogonal directions.

Figure 23:
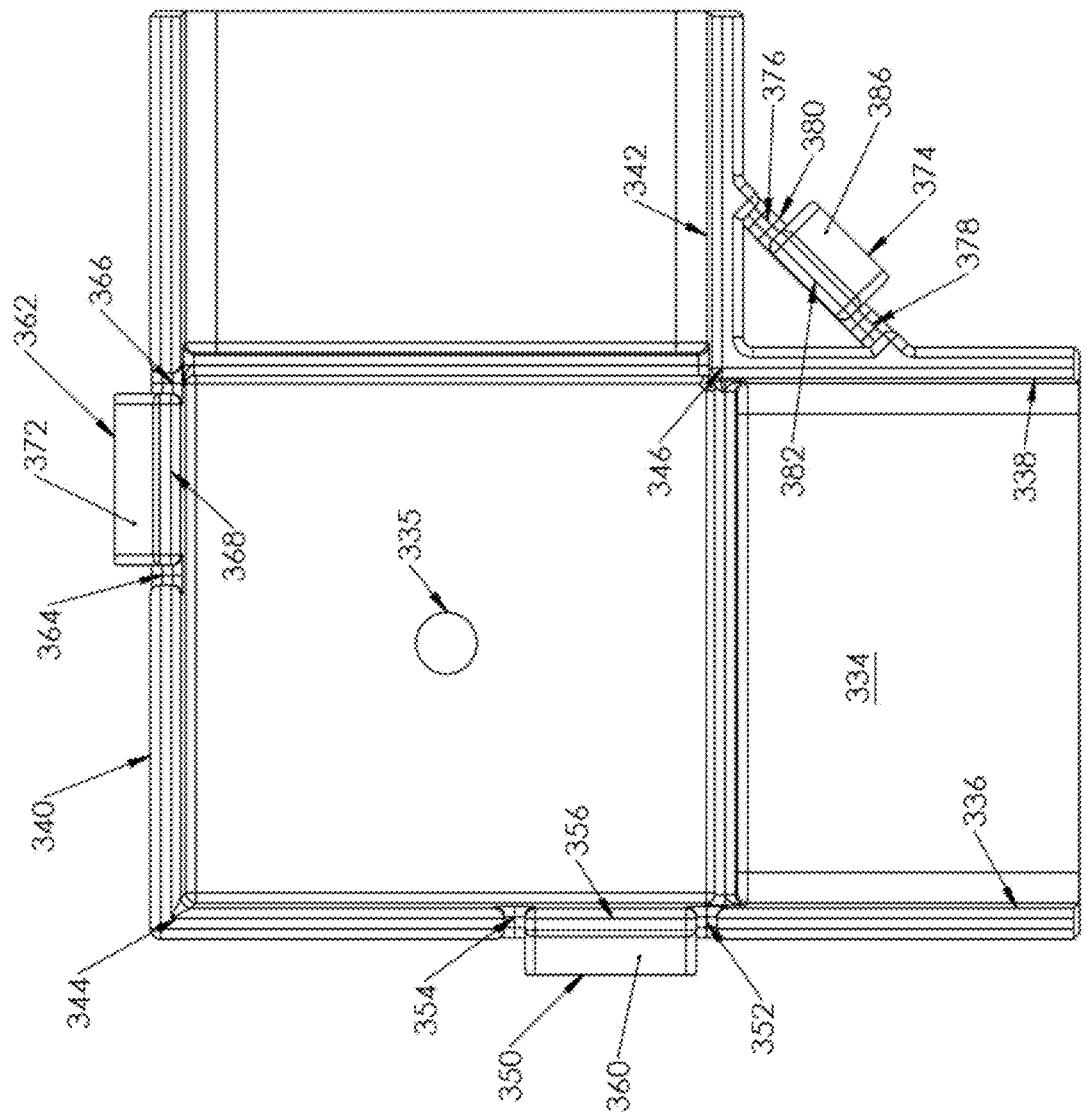
FIG. 23 is a top plan view of the bottom portion of the corner connector shown in FIG. 20.
Figure 24:
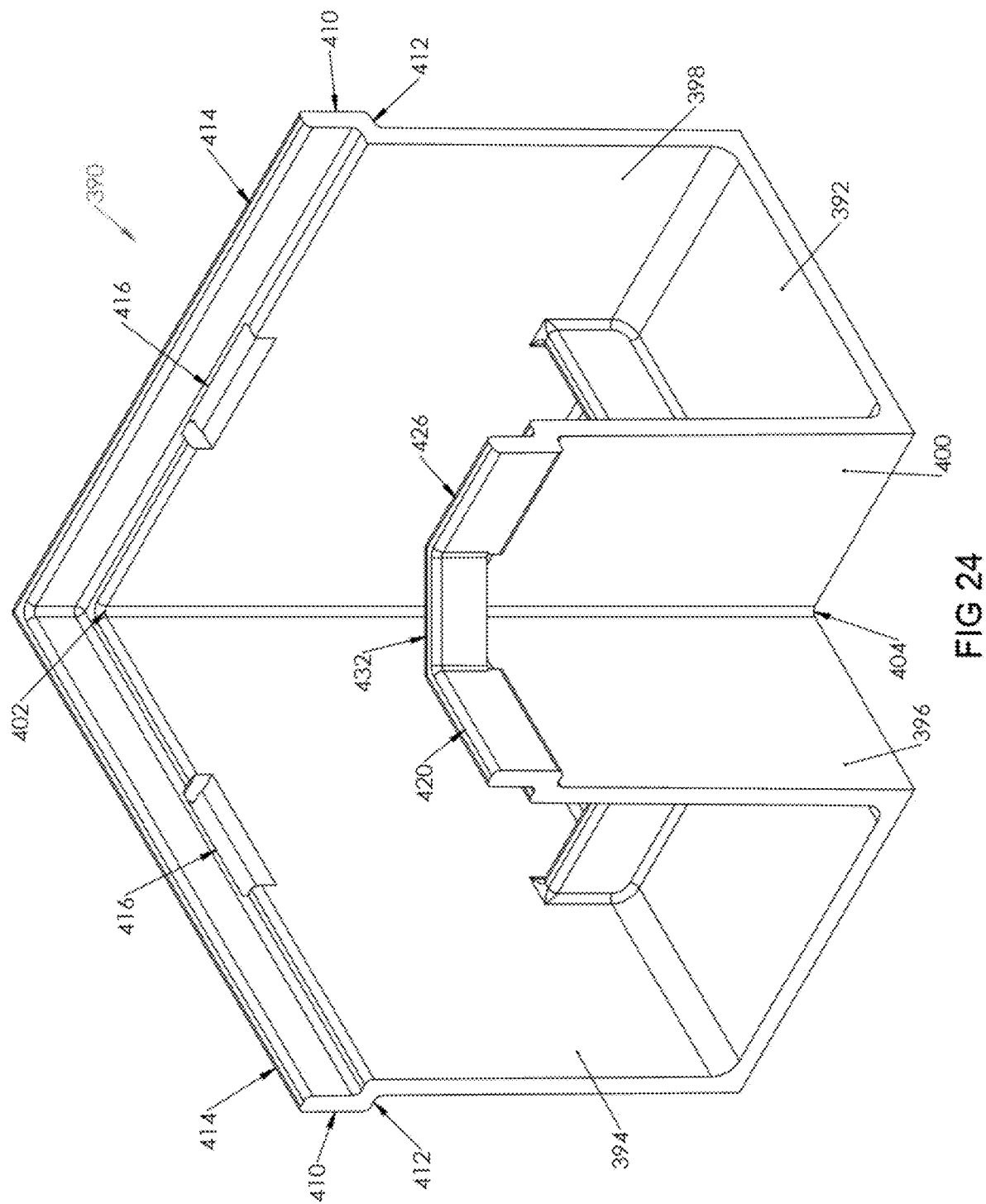
FIG. 24 is a bottom perspective view of a top portion of a corner connector used with the assembly shown in FIG. 1.
Figure 25:
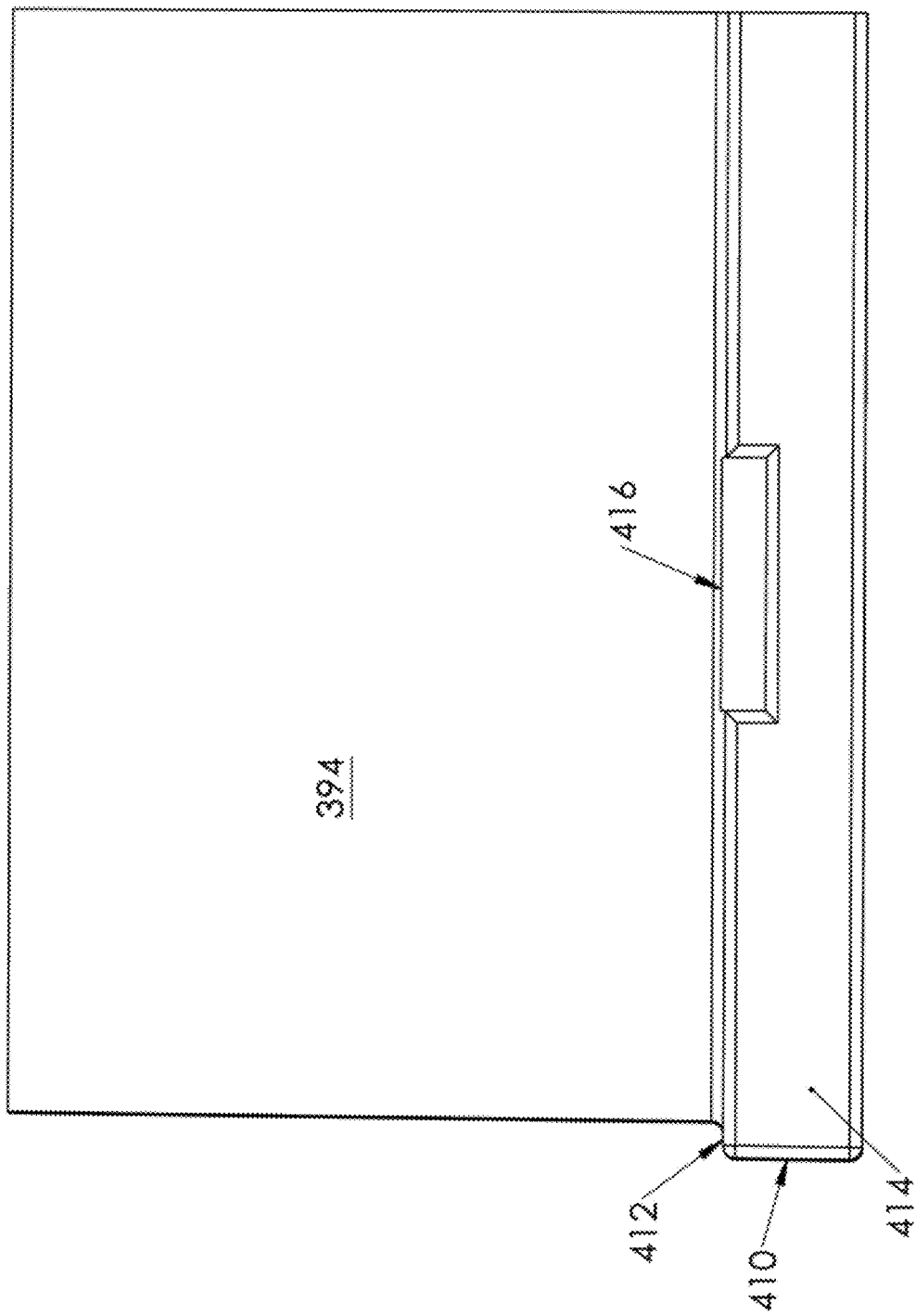
FIG. 25 is a rear elevational view of the top portion of the corner connector shown in FIG. 24.
Figure 26:
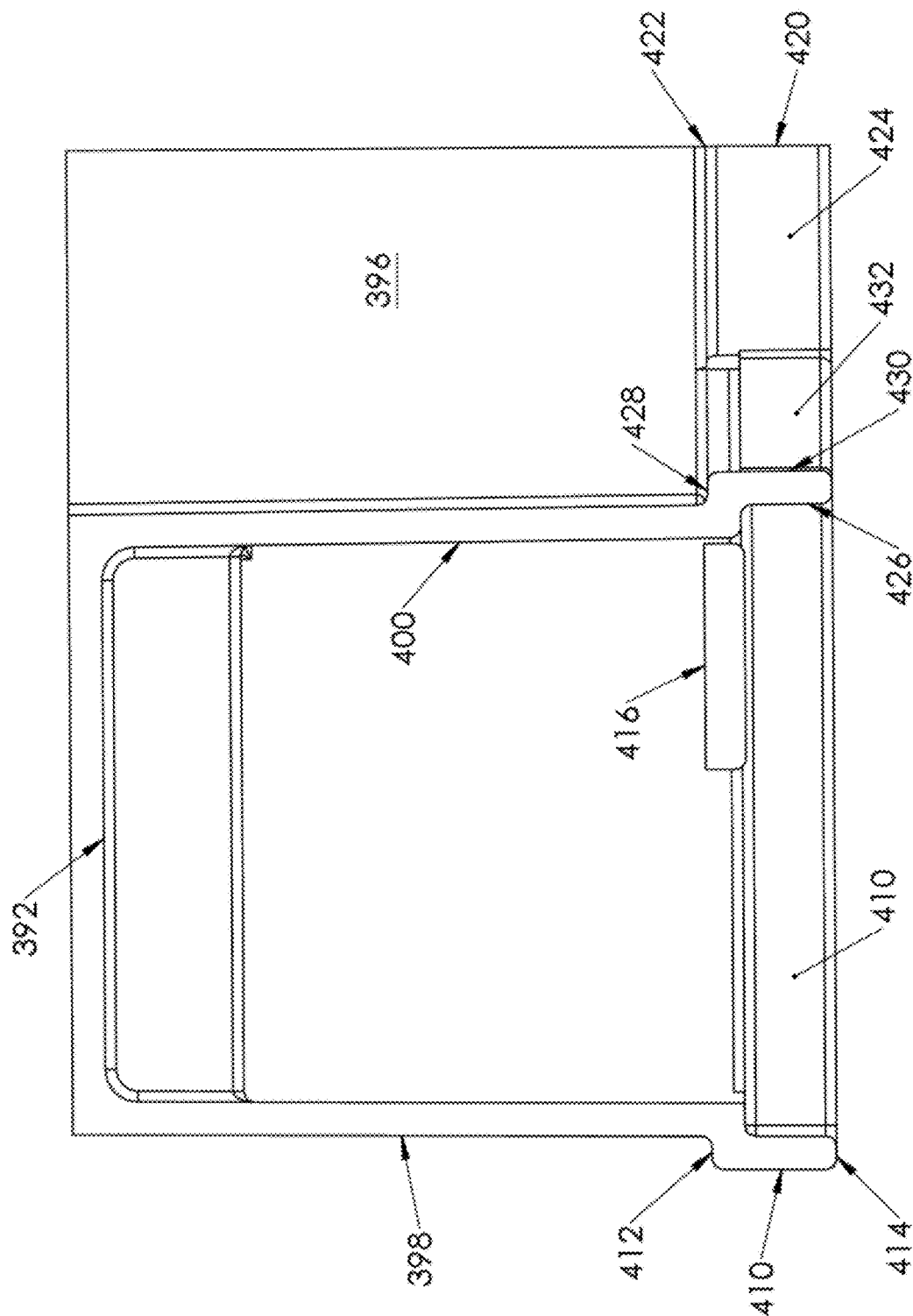
FIG. 26 is a left side elevational view of the top portion of the corner connector shown in FIG. 25.
Figure 27:
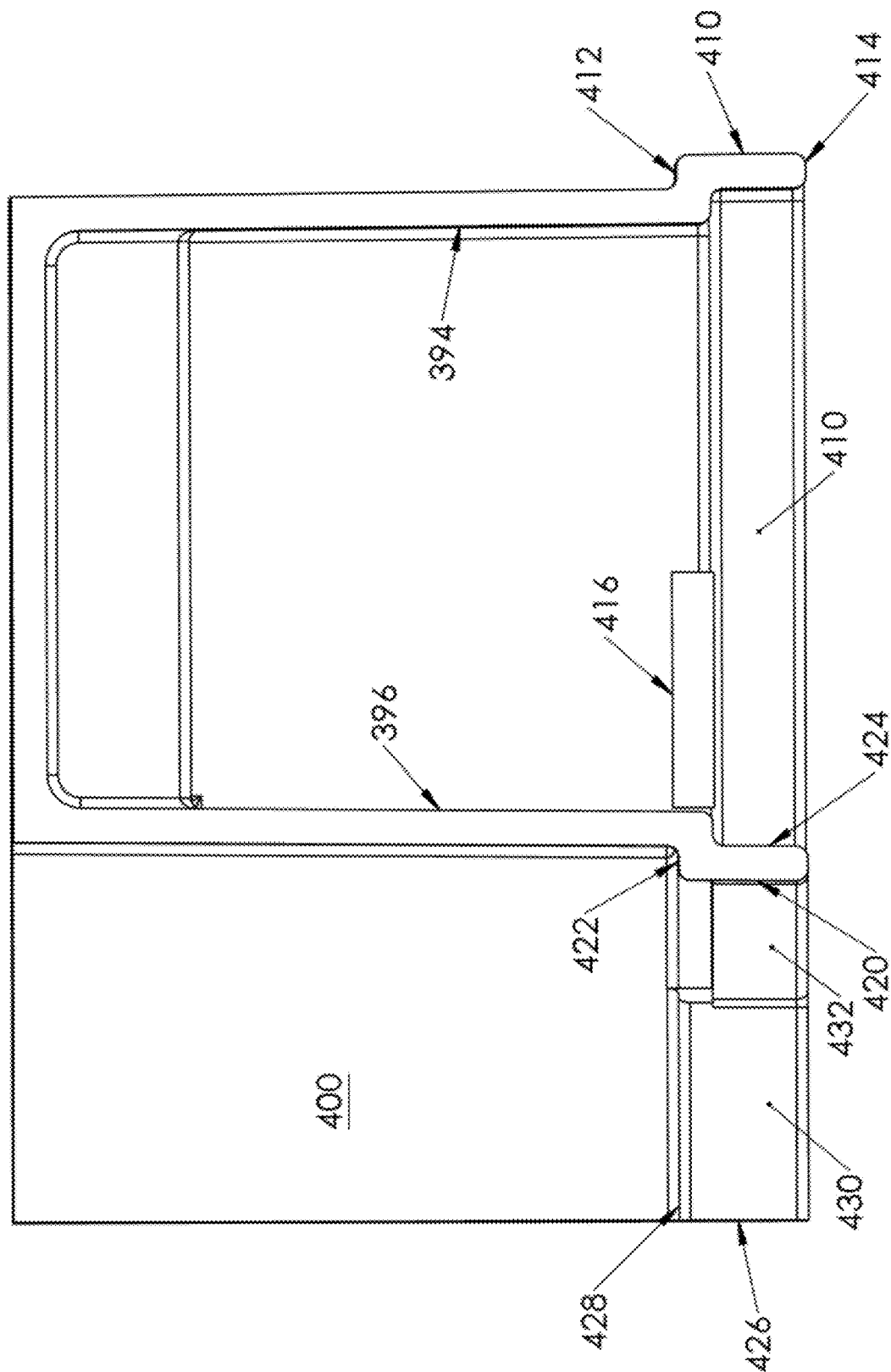
FIG. 27 is a right side elevational view of the top portion of the corner connector shown in FIG. 24.
Figure 28:
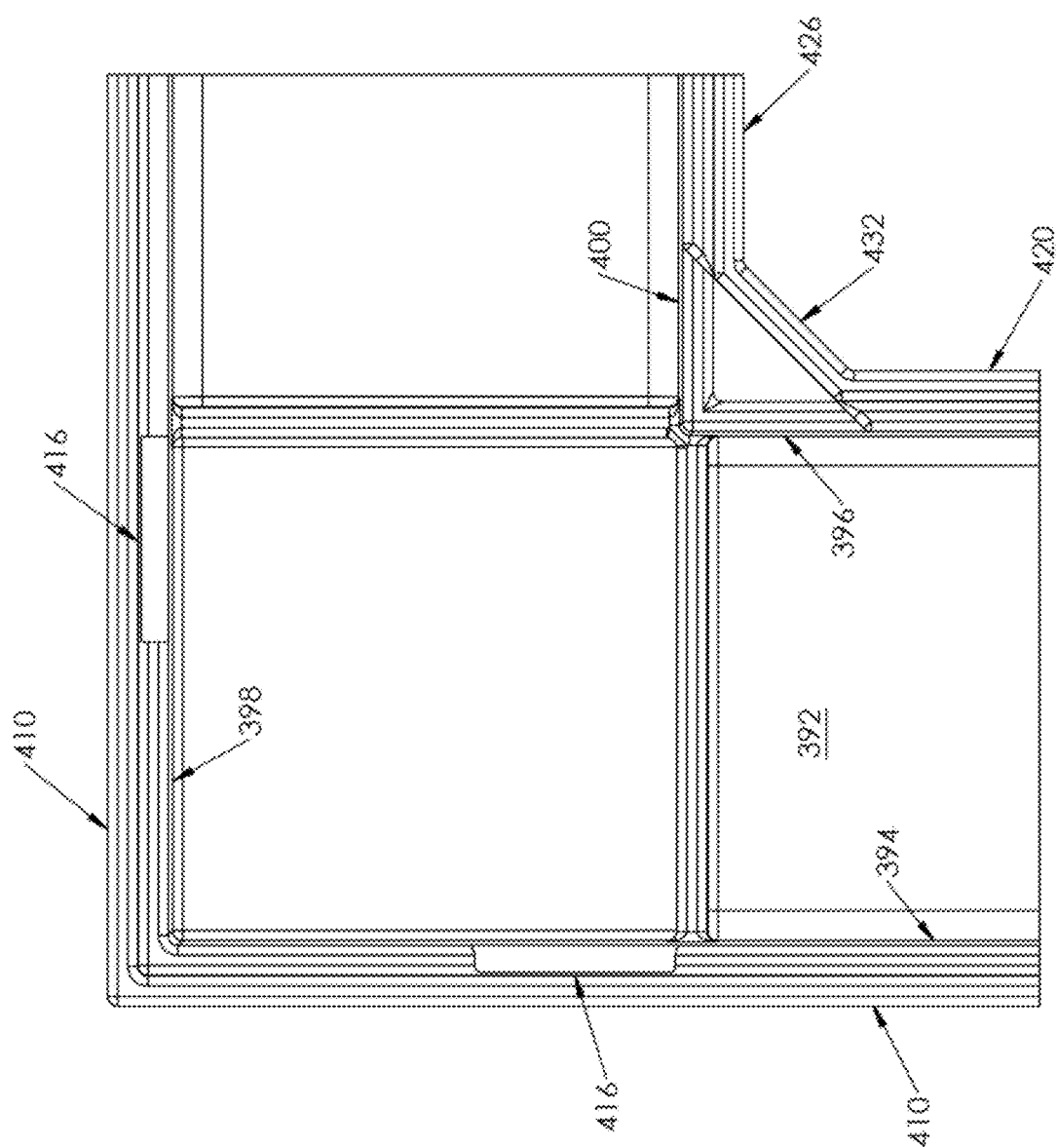
FIG. 28 is a bottom plan view of the top portion of the corner connector shown in FIG. 24.

Corner connector 330 includes a lower member 332 (shown in FIGS. 20-23) and an upper member 390 (shown in FIGS. 24-28). Lower member 332 includes a base 334 that is adapted to be placed against wall 50. Referring to FIG. 23, a generally centrally located through hole 335 extends through base 334. Through hole 335 is used to insert a mounting screw (not shown) therethrough to secure lower member 332 to wall 50.

A first pair of opposing parallel side walls 336, 338 extends upwardly from base 334. A second pair of opposing parallel side walls 340, 342, extending orthogonally to side walls 336, 338, extends upwardly from base 334 such that side wall 340 joins side wall 336 at an outer corner 344 and side wall 342 joins side wall 338 at an inner corner 346.

Side wall 336 includes a top central locking member 350 that extends upwardly from side wall 336 and is defined by parallel slots 352, 354 that extend from locking member 350 through side wall 336 partially toward base 334 so that locking member 350 is able to flex relative to the remainder of side wall 336.

Locking member 350 is a tang that includes a top surface 356 extending outwardly from side wall 336, away from base 334. A bottom surface 358 extends outwardly from side wall 336, away from base 334, such that bottom surface 358 extends generally co-linearly with the top of side wall 336. Bottom surface 358 extends farther from side wall 336 than top surface 356. A sloped surface 360 connects top surface 356 and bottom surface 358, forming the tang.

Similarly, side wall 340 includes a top central locking member 362 that extends upwardly from side wall 340 and is defined by parallel slots 364, 366 that extend from locking member 362 through side wall 340 partially toward base 334 so that locking member 362 is able to flex relative to the remainder of side wall 336.

Locking member 362 is a tang that includes a top surface 368 extending outwardly from side wall 340, away from base 334. A bottom surface 370 extends outwardly from side wall 340, away from base 334, such that bottom surface 370 extends generally co-linearly with the top of side wall 340. Bottom surface 370 extends farther from side wall 340 than top surface 368. A sloped surface 372 connects top surface 368 and bottom surface 370, forming the tang.

A locking member 374 extends at an angle from side walls 338, 342. Locking member 374 is formed in a connecting piece 376 that connects a top portion of side wall 338 with a top portion of side wall 342. In an exemplary embodiment, the angle is about 45 degrees.

Locking member 374 extends upwardly from connecting piece 376 above both of side walls 338, 342 and is defined by parallel slots 378, 380 that extend from locking member 374 partially through connecting piece 376 so that locking member 374 is able to flex relative to the remainder of connecting piece 376.

Locking member 374 is a tang that includes a top surface 382 extending outwardly from connecting piece 376, away from side walls 338, 342. A bottom surface 384 extends outwardly from connecting piece 376, away from side walls 338, 342 such that bottom surface 384 extends generally co-linearly with the top of side walls 338, 342. Bottom surface 384 extends farther from connecting piece 376 than top surface 382. A sloped surface 386 connects top surface 382 and bottom surface 384, forming the tang.

Referring to FIGS. 24-28, upper member 390 includes a base 392 that is adapted to be located away from wall 50. A first pair of opposing parallel side walls 394, 396 extends downwardly from base 392 (shown as upwardly in FIG. 24 for clarity). A second pair of opposing parallel side walls 398, 400, extending orthogonally to side walls 394, 396, extends downwardly from base 392 such that side wall 398 joins side wall 394 at an outer corner 402 and side wall 400 joins side wall 396 at an inner corner 404.

Each side wall 394, 398 includes a lip 410 that extends the length thereof. Lip 410 includes an offset 412 that extends generally orthogonally from its respective side wall 394, 396 and a lip wall 414 that extends from offset 412 generally parallel to side walls 394, 396.

Lip 410 includes a longitudinal slot 416 located along the length of each side wall 394, 396 so that, when upper member 390 is disposed over lower member 332 and lips 410 extend over the top of respective side walls 336, 340, locking members 374, 386 are each insertable into a slot 416 to releasably secure upper member 390 to lower member 332.

Side wall 396 includes a lip 420 that extends partially along the length of side wall 396. Lip 420 includes an offset 422 that extends generally orthogonally from side wall 396 and a lip wall 424 that extends from offset 422 generally parallel to side wall 396.

Similarly, side wall 400 includes a lip 426 that extends partially along the length of side wall 400. Lip 426 includes an offset 428 that extends generally orthogonally from side wall 400 and a lip wall 430 that extends from offset 428 generally parallel to side wall 400.

A connector piece 432 extends at an angle between lip walls 424, 430. In an exemplary embodiment, connector piece 432 extends at an angle of about 45 degrees. When upper member 390 is disposed over lower member 332 and lips 420, 426 extend over the top of side walls 338, 342, locking member 374 is insertable behind connector piece 432 to releasably secure upper member 390 to lower member 332.

Figure 29:
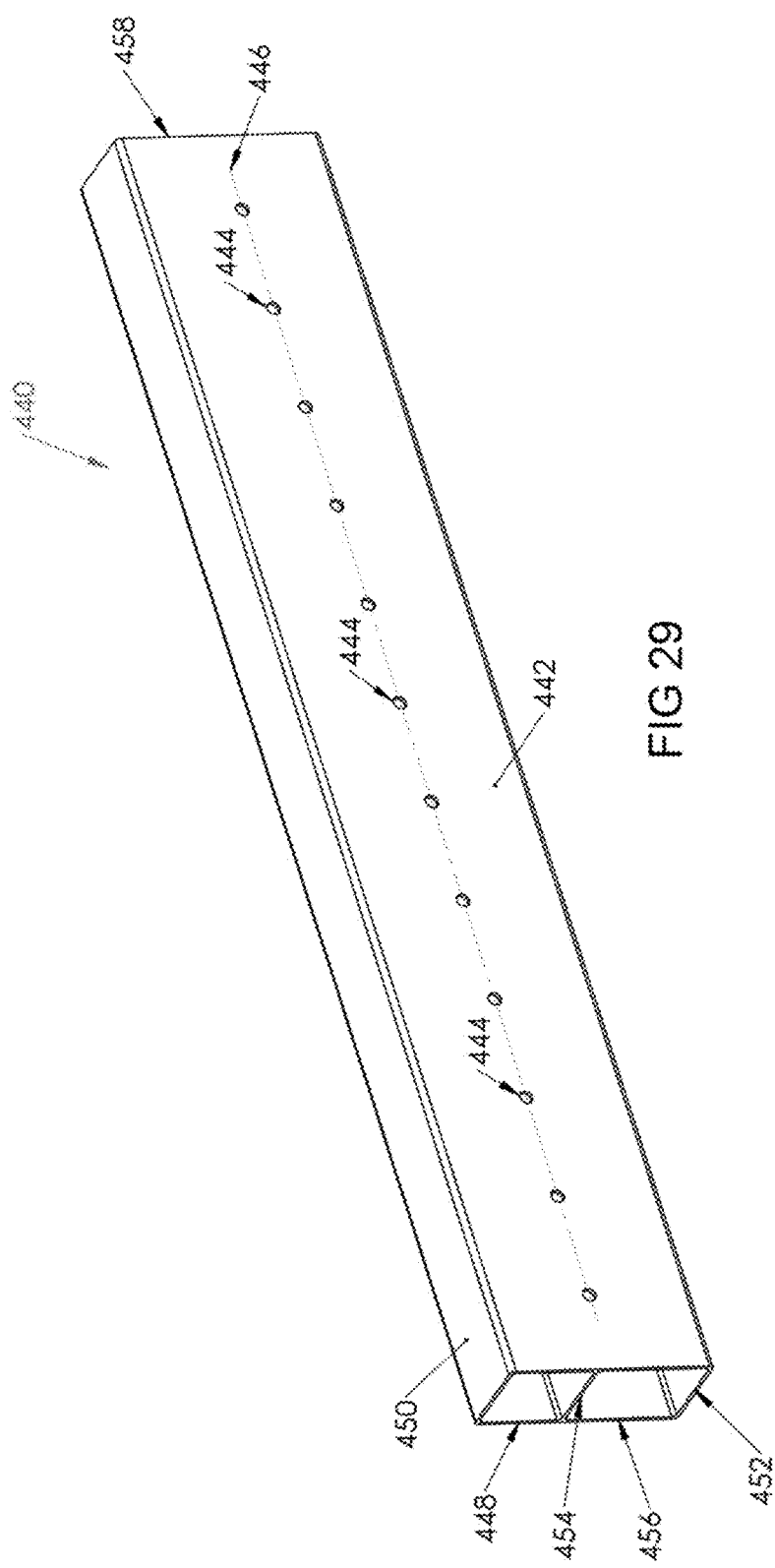
FIG. 29 is a perspective view of a vertical elongate member used with the assembly of FIG. 1.
Figure 30:
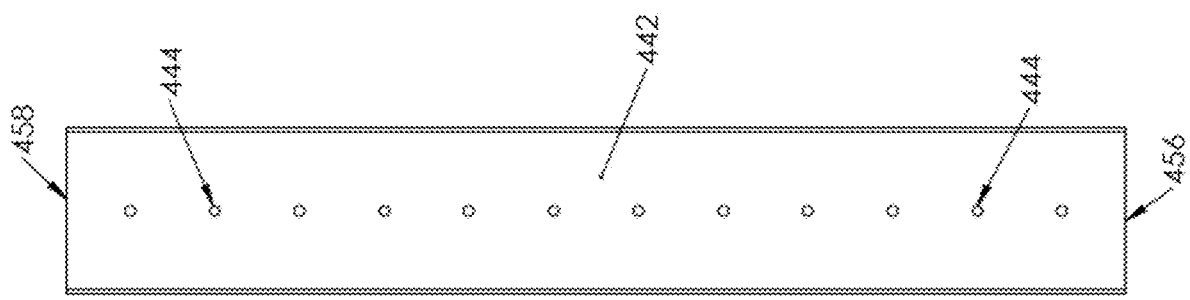
FIG. 30 is a side elevational view of the vertical elongate member shown in FIG. 29.
Figure 31:
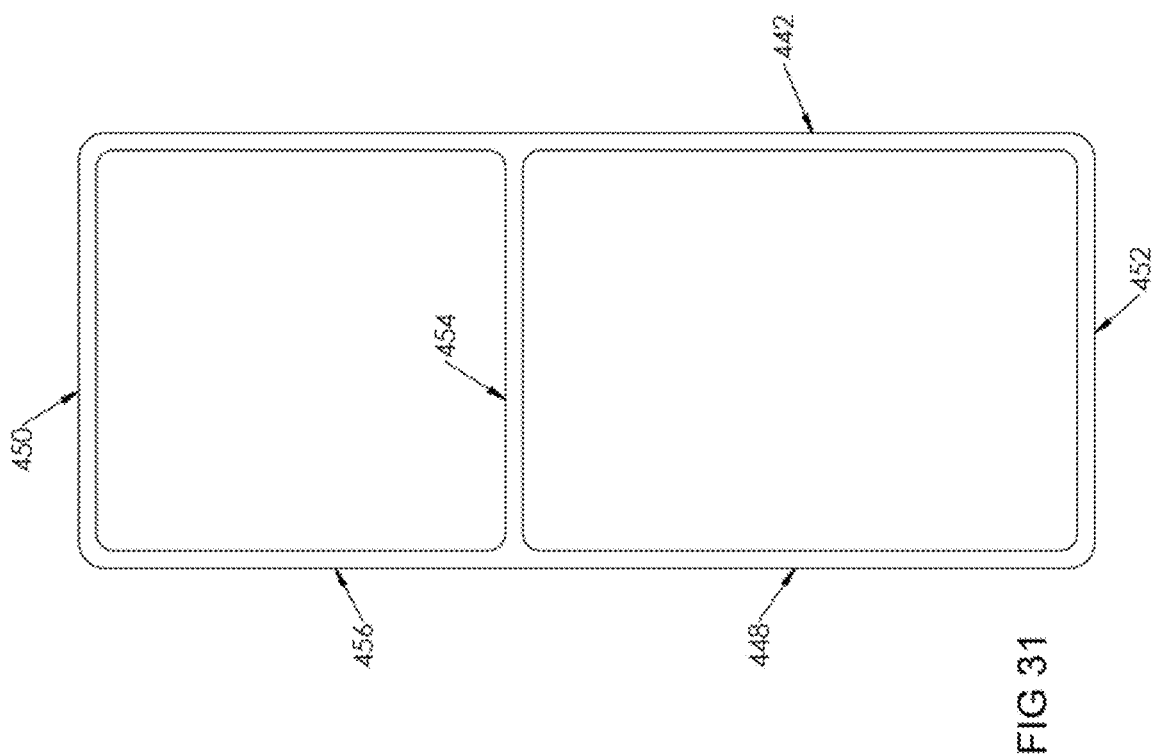
FIG. 31 is an end elevational view of the vertical elongate member shown in FIG. 29.

Referring now to FIGS. 29-31, a vertical elongate member 440 is shown. Vertical elongate member 440 is generally parallelepiped in shape and is sized to fit partially within any of coupling connector 110, tee connector 170 or corner connector 330, as shown in FIG. 1.

Vertical elongate member 440 includes an inner wall 442 having a plurality of spaced apart openings 444 formed therein. Inner wall 442 faces inwardly into an assembled assembly 100. Openings 444 are formed in inner wall 442 along a common central longitudinal axis 446. Openings 444 accept screws (not shown) for supporting the organization kits brackets disclosed in U.S. Pat. No. 9,560,914.

An outer wall 448 extends parallel to inner wall 442. Connector walls 450, 452 connect inner wall 442 and outer wall 448 to each other, forming the parallelepiped structure. An internal support wall 454 is formed internally of member 440, off axis 446 to allow for the formation of openings 444. Ends 456, 458 are located at opposing ends of member 440 and are insertable into one of coupling connector 110, tee connector 170 or corner connector 330 to form assembly 100.

Although vertical elongate member 440 is intended for use in the vertical direction, those skilled in the art will recognize that vertical elongate member 440 can be used in the horizontal direction as well.

Figure 32:
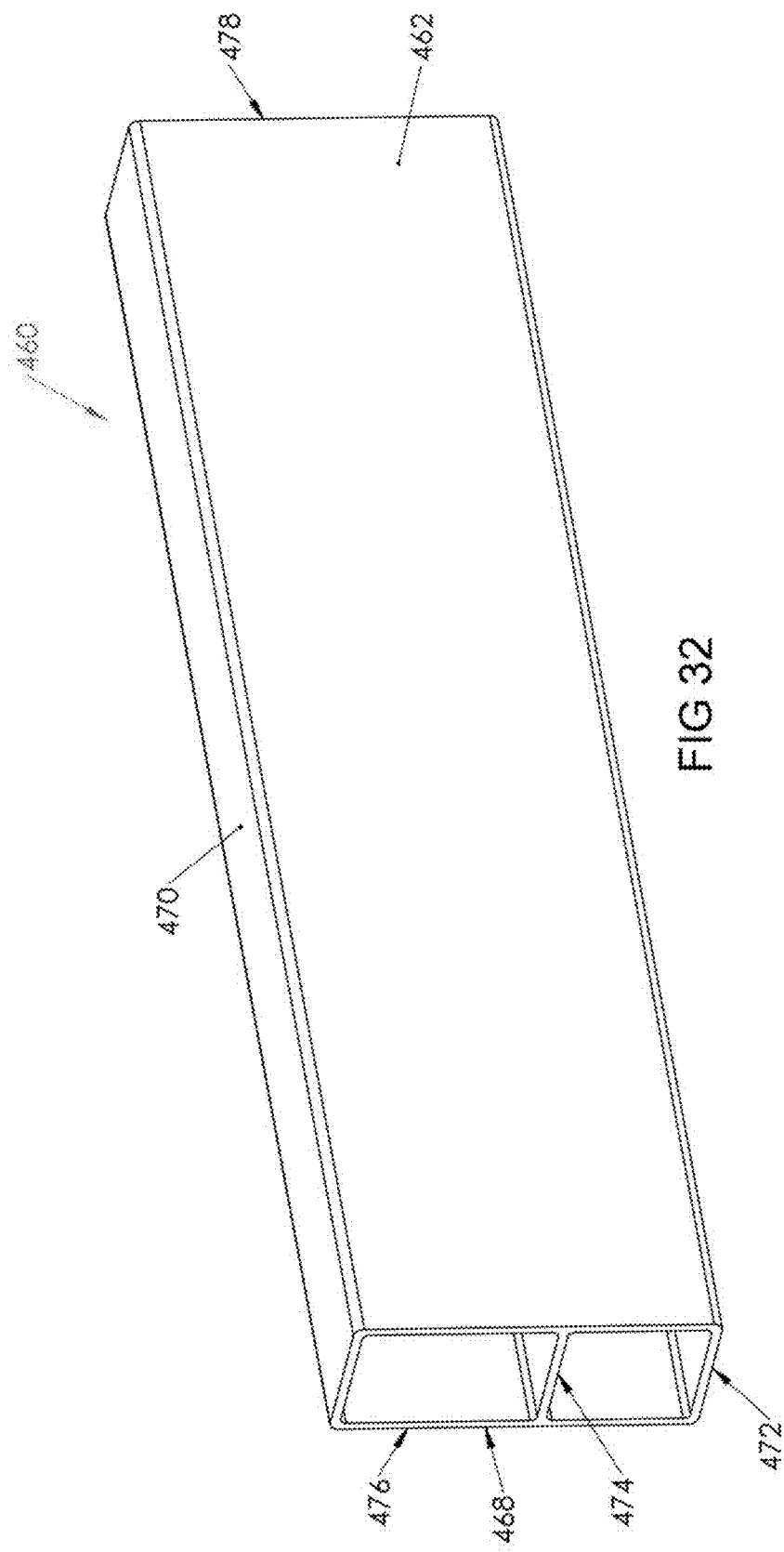
FIG. 32 is a perspective view of a horizontal elongate member used with the assembly of FIG. 1.
Figure 33:
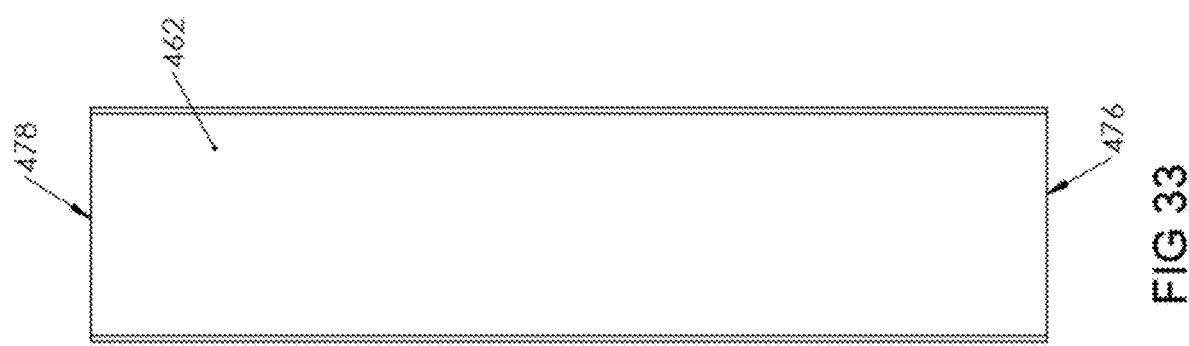
FIG. 33 is a side elevational view of the horizontal elongate member shown in FIG. 32.
Figure 34:
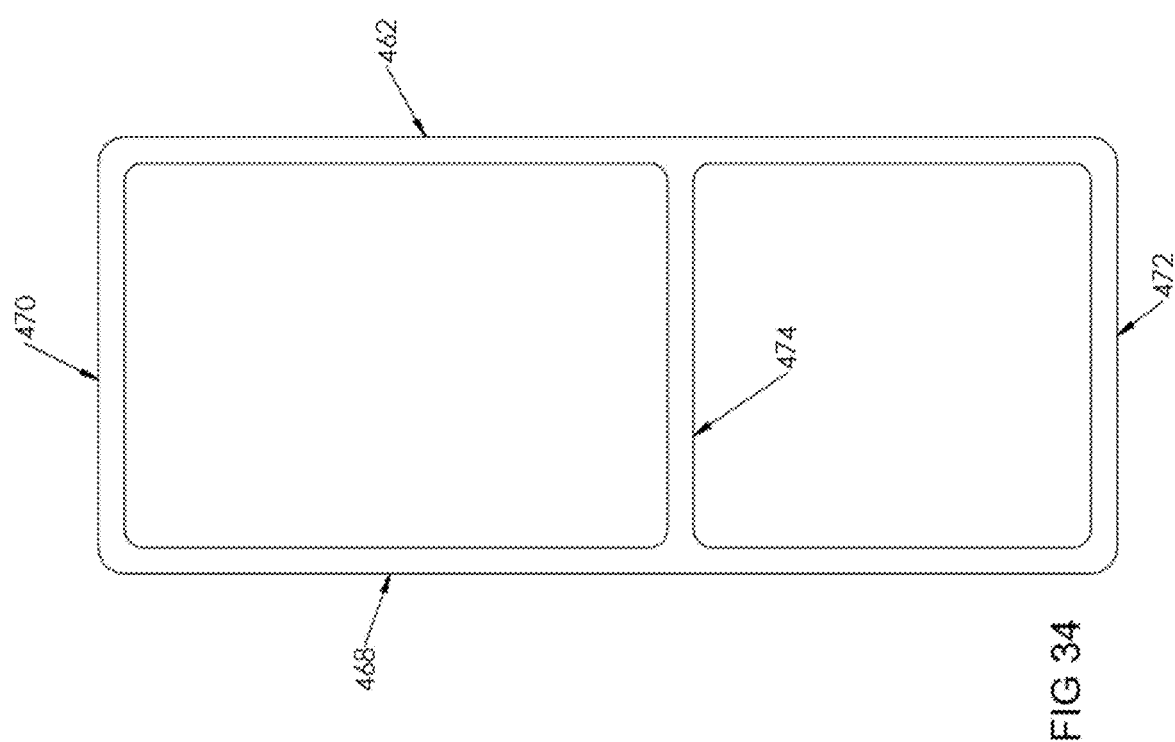
FIG. 34 is an end elevational view of the horizontal elongate member shown in FIG. 32.

Horizontal elongate member 460 is shown in FIGS. 32-34. Horizontal elongate member 460 is similar to vertical elongate member 440, but without through openings 444. Vertical elongate member 460 is generally parallelepiped in shape and is sized to fit partially within any of coupling connector 110, tee connector 170 or corner connector 330, as shown in FIG. 1.

Vertical elongate member 460 includes an inner wall 462. Inner wall 462 faces inwardly into an assembled assembly 100. An outer wall 468 extends parallel to inner wall 462. Connector walls 470, 472 connect inner wall 462 and outer wall 468 to each other, forming the parallelepiped structure. An internal support wall 474 is formed internally of member 460. Ends 476, 478 are located at opposing ends of member 460 and are insertable into one of coupling connector 110, tee connector 170 or corner connector 330 to form assembly 100.

In an exemplary embodiment, all of coupling connector 110, tee connector 170, corner connector 330, vertical elongate member 440, and horizontal elongate member 460 can be constructed from Acrylonitrile butadiene styrene, although those skilled in the art will recognize that other materials can be used.

The cross-sections of members 440, 460, shown in FIGS. 31 and 34, respectively, are sized similarly to standard 2"×4" wood so that, instead of using members 440, 460, if desired, 2"×4"s can be used instead. Further, members 440, 460 can be cut to any desired length to make frame 100 modular in size, depending on the particular needs and space constraints of a user.

Figure 35:
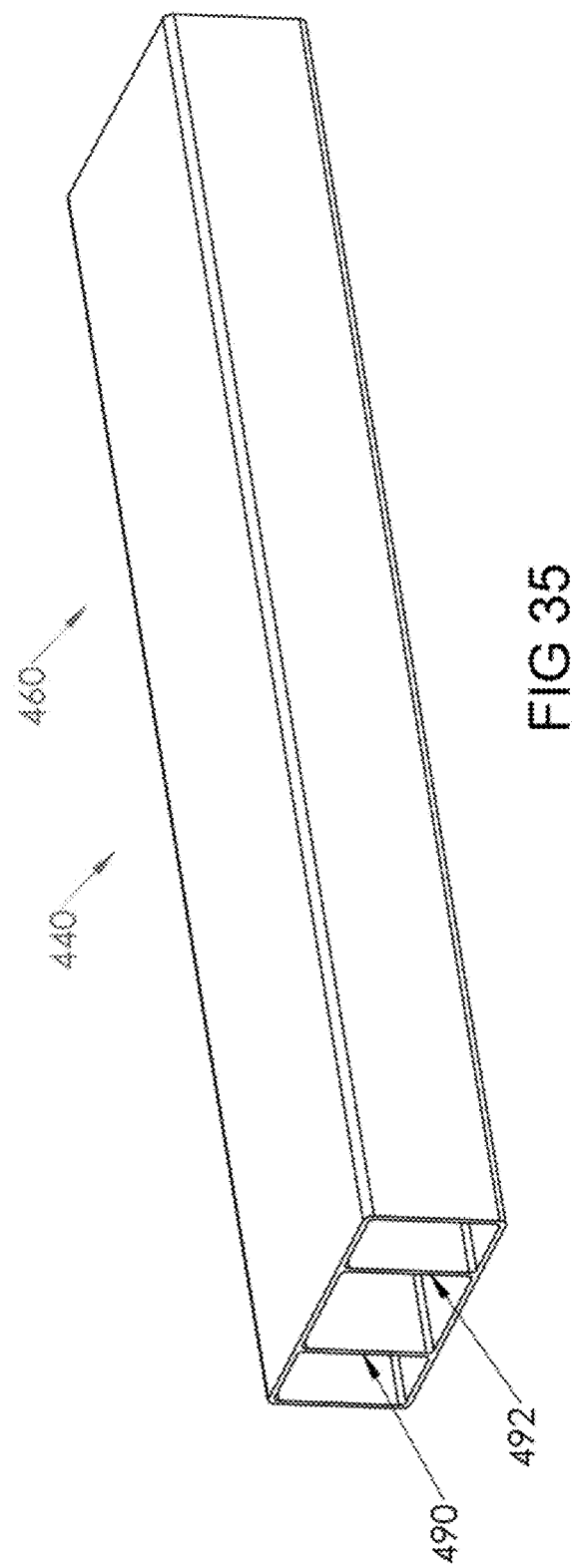
FIG. 35 is a perspective view of an alternative embodiment of an elongate member for use with the assembly shown in FIG. 1.

Alternatively, instead of members 440, 460 having a single internal support wall 454, 474, respectively, members 440', 460', shown in FIG. 35, can have two internal support walls 490, 492, which may be added to meet a particular building code or custom.

Figure 36:
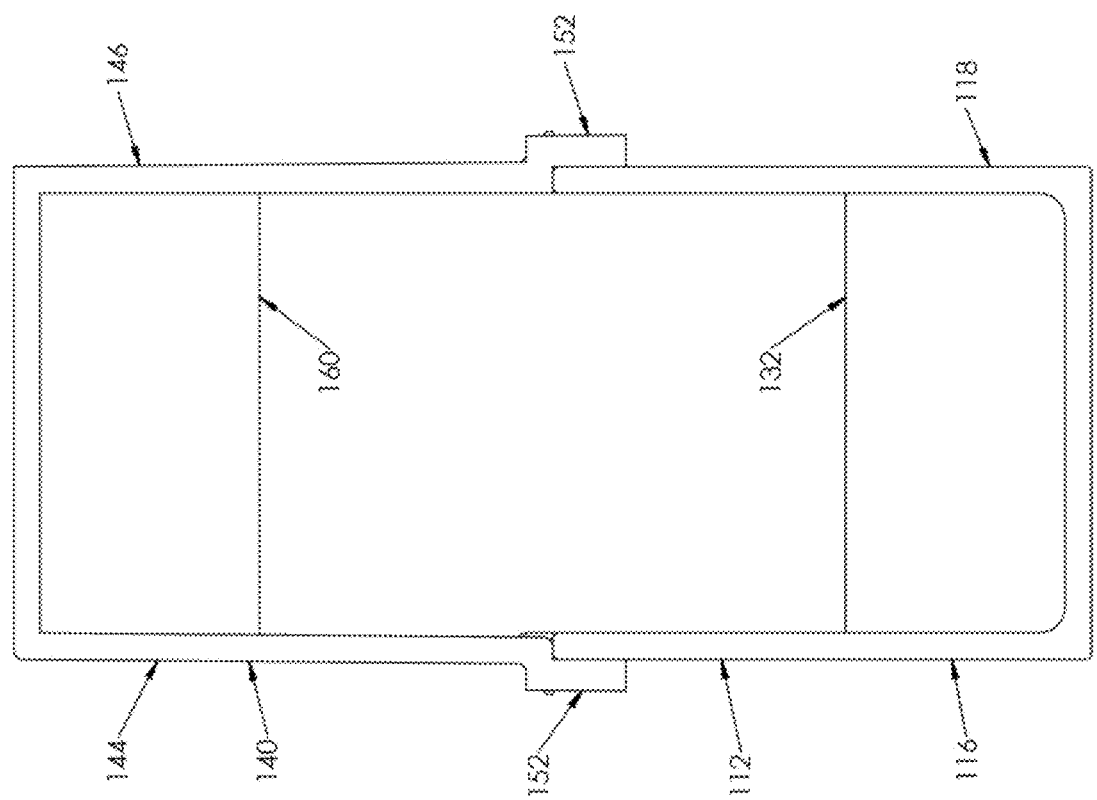
FIG. 36 is an end elevational view of the lower portion of the connector shown in FIG. 5 connected to the top portion of the connector shown in FIG. 9.

Referring to FIG. 36, a side elevational view of coupling connector 110 is shown, with upper member 140 coupled to lower member 112, demonstrating the opening size of coupling connector 110, providing for a snug fit for any of members 440, 460 or a 2"×4". Stoppers 132, 160 are co-planar and stop members 440, 460, or a 2"×4" from being further inserted into coupling connector 110. Other stoppers described and shown herein perform the same function.

Figure 37:
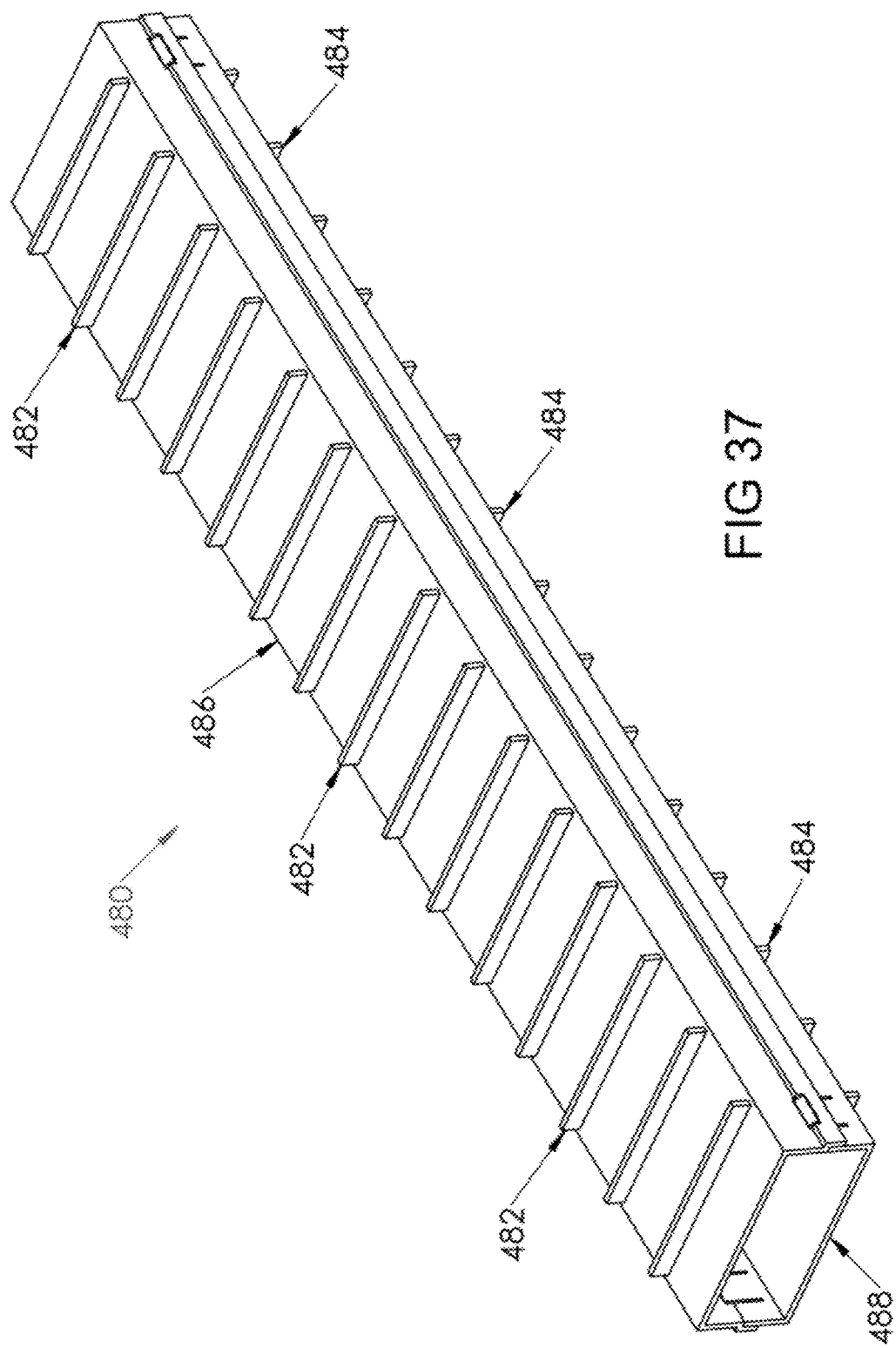
FIG. 37 is a perspective view of an alternative embodiment of a vertical elongate member for use with the assembly shown in FIG. 1.

Referring to FIG. 37, instead of vertical elongate member 440, a vertical elongate member 480 can be used. Member 480 is a two-piece member, similar to connectors 110, 170, 330, and can use the same lip and tang connection method discussed above with respect to connectors 110, 170, 330. Instead of openings 444, however, member 480 includes a plurality of spaced apart fins 482, 484 on each of opposing sides 486, 488, respectively. Fins 482, 484 are spaced apart from adjacent fins 482, 484 sufficiently to allow a shelf, similar to the shelves disclosed in U.S. Pat. No. 9,560,914, to be slid between adjacent fins 482, 484 such that fins 482, 494 vertically support the shelves, eliminating the need for the brackets disclosed in U.S. Pat. No. 9,560,914.

An exemplary method of installing assembly 100 includes locating a bottom corner where assembly 100 is to be mounted on wall 50 and installing a corner connector lower member 390 at the bottom corner. Next, assembly 100 is built out vertically upwardly and horizontally away from lower member 390. All of lower member 112 of coupling connectors 110, lower members 172 of tee connectors 170, and lower members 332 of corner connectors 330 are secured to the wall 50 prior to snapping upper members 140 of coupling connectors 110, upper members 260 of tee connectors 170, and upper members 390 of corner connectors 330 onto their respective lower members.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A modular frame assembly comprising:
a plurality of connecting pieces comprising:
a plurality of coupling connectors;
a plurality of tee connectors;
a plurality of corner connectors; and
a plurality of elongate members,
wherein each of the plurality of connecting pieces comprises generally planar and parallel first and second sidewalls and a generally planar base connecting the first and second sidewalls,
wherein each of the plurality of coupling connectors, tee connectors, and corner connectors is adapted to receive at least two of the plurality of elongate members such that a rectangular structure can be constructed from the plurality of connecting pieces,
wherein each of the plurality of tee connectors has a generally T-shaped body, and wherein each body comprises at least one locking member mounted outwardly of the body.

2. The modular frame assembly according to claim 1, wherein each of the plurality of coupling connectors, the plurality of tee connectors, and the plurality of corner connectors comprises a top portion and a bottom portion.

3. The modular frame assembly according to claim 2, wherein each of the top portions comprises a plurality of tangs and each of the bottom portions comprises a same number of slots as the plurality of tangs.

4. The modular frame assembly according to claim 2, wherein each of the top portions and the bottom portions comprises a stopper.

5. The modular frame assembly according to claim 1, wherein the plurality of elongate members comprises a first subset of vertical members and a second subset of horizontal members.

6. The modular frame assembly according to claim 5, wherein the first subset of vertical members comprises a plurality of spaced apart fins.

7. The modular frame assembly according to claim 5, wherein the first subset of vertical members comprises a plurality of openings extending along a length thereof.

8. The modular frame assembly according to claim 1, wherein each of the plurality of corner connectors has a body, and wherein each body comprises at least one locking member mounted outwardly of the body.

9. A modular frame assembly comprising:
a plurality of connecting pieces, each of the plurality of pieces comprising:
a base;
a first sidewall extending upwardly from the base, the first sidewall having a first locking member extending upwardly from the first sidewall, the first locking member being defined by a first pair of parallel slots and a first tang extending outwardly from the first sidewall between the first pair of parallel slots; and
a second sidewall extending upwardly from the base, parallel to the first sidewall,
wherein each of the plurality of connecting pieces further comprises at least one stopper connected to the base, the first sidewall, and the second sidewall,
wherein each of the plurality of connecting pieces has a free end and wherein the stopper is located between the free end and the first locking member, and
further comprising an elongate member adapted to be inserted into the free end and engage the stopper.

10. The modular frame assembly according to claim 9, wherein the second sidewall includes a second locking member extending upwardly from the second sidewall, the second locking member being defined by a second pair of parallel slots and a second tang extending outwardly from the second sidewall between the second pair of parallel slots.

11. The modular frame assembly according to claim 9, wherein the second sidewall includes a second locking member attached to and extending outwardly from the second sidewall.

12. The modular frame assembly according to claim 9, wherein the stopper extends perpendicular to the base, the first sidewall, and the second sidewall.

13. The modular frame assembly according to claim 9, further comprising a plurality of elongate members, each of the plurality of elongate members adapted to be inserted between two of the plurality of connecting pieces.

14. The modular frame assembly according to claim 9, wherein each of the plurality of connecting pieces comprises a bottom piece, and wherein the assembly further comprises a plurality of top pieces, each of the plurality of top pieces being adapted to secure to a respective one of the bottom pieces.

15. The modular frame assembly according to claim 14, wherein each of the plurality of top pieces comprises a top locking member adapted to engage the first locking member.

16. A modular frame assembly comprising:
a plurality of connecting pieces, each of the plurality of pieces comprising:
a base;
a first sidewall extending upwardly from the base, the first sidewall having a first locking member extending upwardly from the first sidewall, the first locking member being defined by a first pair of parallel slots and a first tang extending outwardly from the first sidewall between the first pair of parallel slots; and
a second sidewall extending upwardly from the base, parallel to the first sidewall,
wherein each of the plurality of connecting pieces further comprises at least one stopper connected to the base, the first sidewall, and the second sidewall, wherein the stopper extends perpendicular to the base, the first sidewall, and the second sidewall.

* * * * *